(12) United States Patent
Tabata et al.

(10) Patent No.: US 7,849,285 B2
(45) Date of Patent: Dec. 7, 2010

(54) METHOD FOR SCHEDULING OF STORAGE DEVICES

(75) Inventors: Shunya Tabata, Tokyo (JP); Nobuo Beniyama, Yokohama (JP); Takuya Okamoto, Machida (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 11/968,214

(22) Filed: Jan. 2, 2008

(65) Prior Publication Data
US 2009/0055520 A1 Feb. 26, 2009

(30) Foreign Application Priority Data
Aug. 23, 2007 (JP) ................................ 2007-216626

(51) Int. Cl.
*G06F 12/00* (2006.01)
(52) U.S. Cl. ...................... 711/170; 713/324
(58) Field of Classification Search ............... None
See application file for complete search history.

(56) References Cited

U.S. PATENT DOCUMENTS

| 7,646,197 | B2 * | 1/2010 | Misaka et al. ............ 324/300 |
| 2004/0054939 | A1 | 3/2004 | Guha et al. |
| 2008/0301474 | A1 * | 12/2008 | Bussa et al. ............ 713/300 |

* cited by examiner

*Primary Examiner*—Hiep T Nguyen
(74) *Attorney, Agent, or Firm*—Brundidge & Stanger, P.C.

(57) ABSTRACT

MAID (Massive Array of Idle Disks) technology can not stop an array group in a time zone in which if any access is made to the array group desired to be stopped. For realization of power saving, the power may be stopped in a time zone when there is no access, but frequent power-on or power-off has a possibility of shortening the life of a physical disk. In addition, if plural physical disks are collectively activated in a particular period, the power consumption of a storage system as a whole in that period is increased sharply, so that there is a possibility that the stable operation of the storage system is adversely affected. For realizing power saving, plural tasks using the storage system is by scheduled and the task execution and the power-on and power-off of a power controlled unit is controlled based on the schedule selected by a user.

11 Claims, 23 Drawing Sheets

2011 STORAGE CONFIGURATION INFORMATION TABLE

| VOLUME ID | CAPACITY | ASSIGNED POWER SUPPLY CONTROLLED UNIT ID |
|---|---|---|
| 0:01 | 10GB | 1-1-1 |
| 0:02 | 20GB | 1-1-1 |
| 0:03 | 10GB | 1-1-1 |
| 0:04 | 10GB | 1-2-1 |
| 0:05 | 20GB | 1-2-1 |
| 0:06 | 10GB | 1-2-1 |
| 0:07 | 20GB | 1-3-1 |
| 0:08 | 20GB | 1-3-1 |
| 0:09 | 10GB | 1-3-1 |
|  |  |  |

FIG.5

| TASK NAME | DESIGNATED TIME | TASK EXECUTABLE TIME ZONE | |
|---|---|---|---|
| TASK A | 17:00 ~ 6:00 | 17:00 | 6:00 |
| TASK B | 18:00 ~ 1:00 | 18:00 | 1:00 |
| TASK C | 21:00 ~ 4:00 | 21:00 | 4:00 |
| TASK D | 3:00 ~ 6:00 | 3:00 | 6:00 |

SETTING SCREEN

TASK EXECUTABLE TIME ZONE SETTING

OK　CANCEL

FIG.6

2012 AP TASK INFORMATION TABLE

| TASK NAME | USE VOLUME ID | EXECUTABLE TIME ZONE | | REQUIRED TIME |
|---|---|---|---|---|
| | | START TIME | END TIME | |
| TASK A | 0:01 | 17:00 | 6:00 | ONE HOUR |
| | 0:04 | | | ONE HOUR |
| TASK B | 0:05 | 18:00 | 1:00 | TWO HOURS |
| | 0:08 | | | TWO HOURS |
| TASK C | 0:09 | 21:00 | 4:00 | ONE HOUR |
| TASK D | 0:03 | 3:00 | 6:00 | ONE HOUR |
| | | | | |

2012A  2012B  2012C  2012D  2012E

FIG.11A
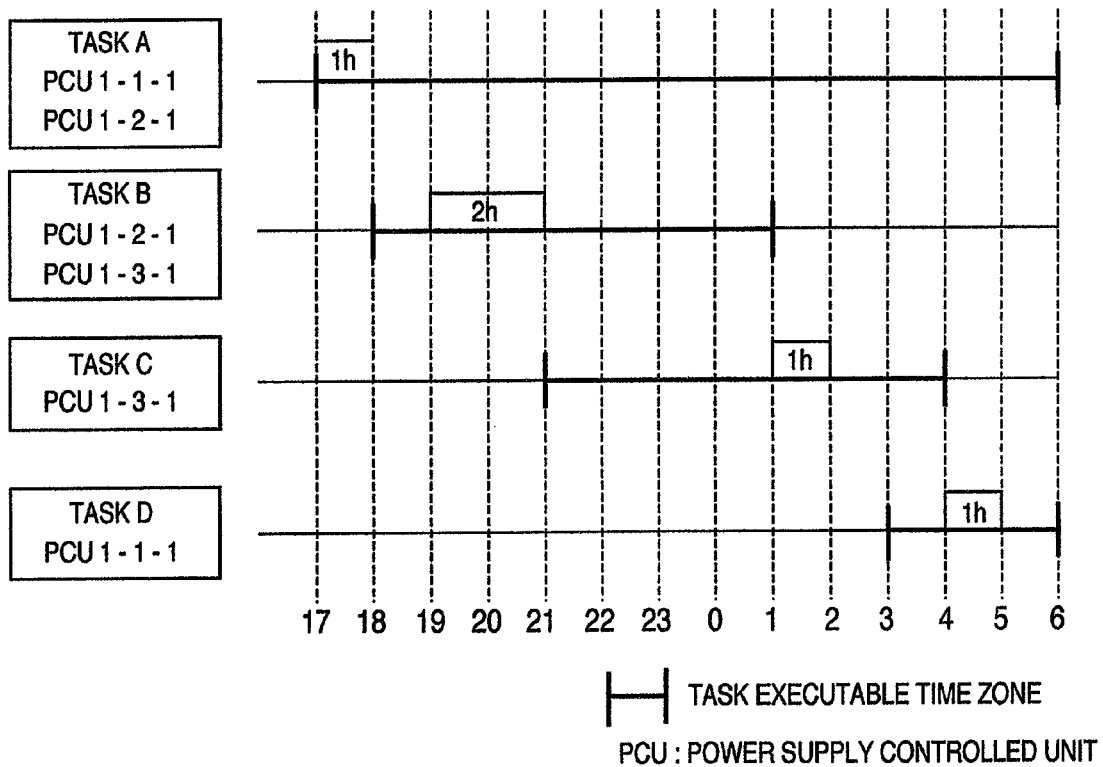
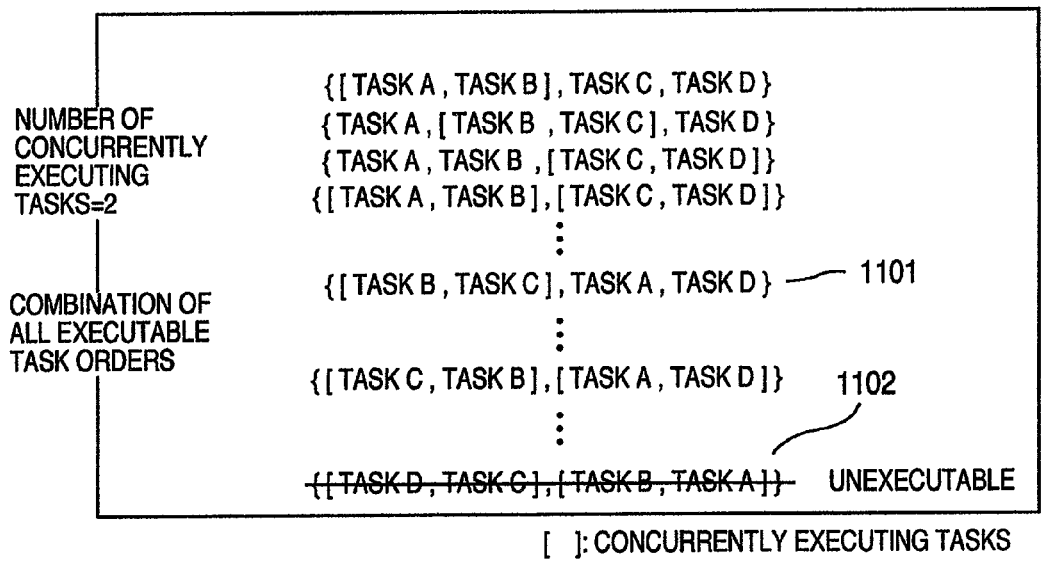

FIG.12

2016 AP TASK EXECUTION SCHEDULE TABLE

| PLAN | TASK | TASK EXECUTION SCHEDULE | |
|---|---|---|---|
| | | TASK EXECUTION TIME | |
| | | START TIME | END TIME |
| PLAN 1 | TASK A | 2:00 | 3:00 |
| | TASK B | 23:00 | 1:00 |
| | TASK C | 1:00 | 2:00 |
| | TASK D | 3:00 | 4:00 |
| PLAN 2 | TASK A | 2:00 | 3:00 |
| | TASK B | 23:00 | 1:00 |
| | TASK C | 22:00 | 23:00 |
| | TASK D | 3:00 | 4:00 |
| PLAN 3 | TASK A | 1:00 | 2:00 |
| | TASK B | 23:00 | 2:00 |
| | TASK C | 0:00 | 1:00 |
| | TASK D | 3:00 | 4:00 |
| | | | |

2017 POWER SUPPLY CONTROL SCHEDULE TABLE

| PLAN | POWER SUPPLY CONTROL SCHEDULE ||||  TOTAL POWER CONSUMPTION | PEAK POWER |
| --- | --- | --- | --- | --- | --- | --- |
| | POWER SUPPLY CONTROLLED UNIT ID | POWER-ON PERIOD || NUMBER OF POWER-OFFS | | |
| | | START-UP TIME | POWER-OFF TIME | | | |
| PLAN 1 | 1 - 1 - 1 | 2:00 | 4:00 | ONE TIME | 120kWh | 30kW |
| | 1 - 2 - 1 | 23:00 | 3:00 | ONE TIME | | |
| | 1 - 3 - 1 | 23:00 | 2:00 | ONE TIME | | |
| PLAN 2 | 1 - 1 - 1 | 2:00 | 4:00 | ONE TIME | 120kWh | 30kW |
| | 1 - 2 - 1 | 23:00 | 3:00 | ONE TIME | | |
| | 1 - 3 - 1 | 22:00 | 1:00 | ONE TIME | | |
| PLAN 3 | 1 - 1 - 1 | 1:00 | 4:00 | ONE TIME | 100kWh | 30kW |
| | 1 - 2 - 1 | 23:00 | 2:00 | ONE TIME | | |
| | 1 - 3 - 1 | 23:00 | 1:00 | ONE TIME | | |
| | | | | | | |

SETTING SCREEN

SELECTION OF TASK EXECUTION SCHEDULE AND POWER SUPPLY CONTROL SCHEDULE

| | TASK EXECUTION SCHEDULE | POWER SUPPLY CONTROL SCHEDULE | | | TOTAL POWER CONSUMPTION | PEAK POWER |
|---|---|---|---|---|---|---|
| | | POWER SUPPLY CONTROLLED UNIT | POWER-ON PERIOD | NUMBER OF POWER-OFFS | | |
| ⦿ PLAN 3 | TASK A / 1:00 ~ 2:00 | 1-1-1 | 1:00 ~ 4:00 | ONE TIME | 100kWh | 30kW |
| | TASK B / 23:00 ~ 2:00 | 1-2-1 | 23:00 ~ 2:00 | ONE TIME | | |
| | TASK C / 0:00 ~ 1:00 | | | | | |
| | TASK D / 3:00 ~ 4:00 | 1-3-1 | 23:00 ~ 1:00 | ONE TIME | | |
| ◯ PLAN 1 | TASK A / 2:00 ~ 3:00 | 1-1-1 | 2:00 ~ 4:00 | ONE TIME | 120kWh | 30kW |
| | TASK B / 23:00 ~ 1:00 | 1-2-1 | 23:00 ~ 3:00 | ONE TIME | | |
| | TASK C / 1:00 ~ 2:00 | | | | | |
| | TASK D / 3:00 ~ 4:00 | 1-3-1 | 23:00 ~ 2:00 | ONE TIME | | |

OK    CANCEL

FIG.16

2018 AP TASK ACTUAL EXECUTION TIME TABLE

| TASK NAME | USE VOLUME ID | ACTUAL EXECUTION TIME |
|---|---|---|
| TASK A | 0:01 | ONE HOUR |
| | 0:04 | ONE HOUR |
| TASK B | 0:05 | TWO HOURS |
| | 0:08 | TWO HOURS |
| TASK C | 0:09 | ONE HOUR |
| TASK D | 0:03 | ONE HOUR |
| | | |

2018A  2018B  2018C

METHOD FOR SCHEDULING OF STORAGE DEVICES

INCORPORATION BY REFERENCE

The present application claims priority from Japanese application JP 2007-216626 filed on Aug. 23, 2007, the content of which is hereby incorporated by reference into this application.

BACKGROUND OF THE INVENTION

The present invention relates to a power-saving technology for storage system.

In recent years, a storage environment is becoming huge with an increase in an amount of data used by companies, and the power consumed by the storage device has become an issue. In addition, there is a problem of a heating value at a data center because of an increase in the power consumption. To solve the problem, there is proposed storage system having a function capable of controlling the start or stop of a disk in a unit of an array group, such as MAID (Massive Array of Idle Disks). For example, US Patent Application Publication No. 2004/0054939 discloses a technology for the MAID in order to realize a low power consumption storage system.

SUMMARY OF THE INVENTION

Meanwhile, since the MAID technology starts or stops the disk in a unit of array groups, the array group cannot be stopped in a time zone in which if there is any access to the same array group. Therefore, in a case where plural accesses are made in different time zones, the power consumption is increased in comparison with the case that the accesses are made in the same time zone. And, to realize the power saving, the power to the time zone in which there is no access may be stopped, but the life of a physical disk might be decreased if the power is frequently turned on or off. In addition, if plural physical disks are collectively activated in a particular period, the power consumption of all the storage system in that period increases suddenly, possibly influencing on the stable operation of the system. For realization of power saving, it is necessary to pay attention to an operation performed under such a condition that a possibility of causing such a disadvantageous situation is decreased.

Under the circumstances described above, the present invention is to realize power saving of the storage system even under prescribed conditions.

The present invention has been made to solve the above problem and realizes power saving of the storage system by the following means.

(1) A schedule plan of optimum tasks, which satisfies a condition about the time of execution of a designated task of a storage system that plural tasks are executed and is judged on the basis of total power consumption, peak power consumption, power-on or power-off frequency and the like, is developed and shown to a user for selection.

(2) Task execution and start/stop control of a power controlled unit are performed based on the schedule plan selected by the user. For the start/stop control, a timing of power control is received from the storage system to schedule in accordance with the execution of actual tasks. Thus, the power saving of the storage system is realized.

(3) To provide a simple task schedule plan to realize power saving by executing another task by following the execution of a particular task.

According to the present invention, power saving of storage system can be realized even under a prescribed condition.

Other objects, features and advantages of the invention will become apparent from the following description of the embodiments of the invention taken in conjunction with the accompanying drawings.

BRIEF DESCRIPTION OF THE DRAWINGS

FIG. 5 shows a screen example that executable time zones of individual tasks are set by a user.

FIG. 6 shows the contents of an AP task information table 2012 according to the first embodiment of the invention.

FIG. 11A is part one of a diagram showing a specific example of schedule plan development processing according to the first embodiment of the invention.

FIG. 12 is a diagram showing an AP task execution schedule table 2016.

FIG. 13 is a diagram showing a power control schedule table 2017.

FIG. 14 is a diagram showing a screen example for presentation and selection of an AP task execution schedule plan.

FIG. 16 is a diagram showing an AP task actual execution time table 2018.

DESCRIPTION OF THE EMBODIMENTS

Embodiments of the invention are described in detail below with reference to the figures.

1. First Embodiment

The first embodiment creates a schedule plan to be selected by a user to manage storage system in order to achieve power saving. Details including a method of developing the schedule plan, and the like are described below.

1.1. System Configuration

Figure 1:
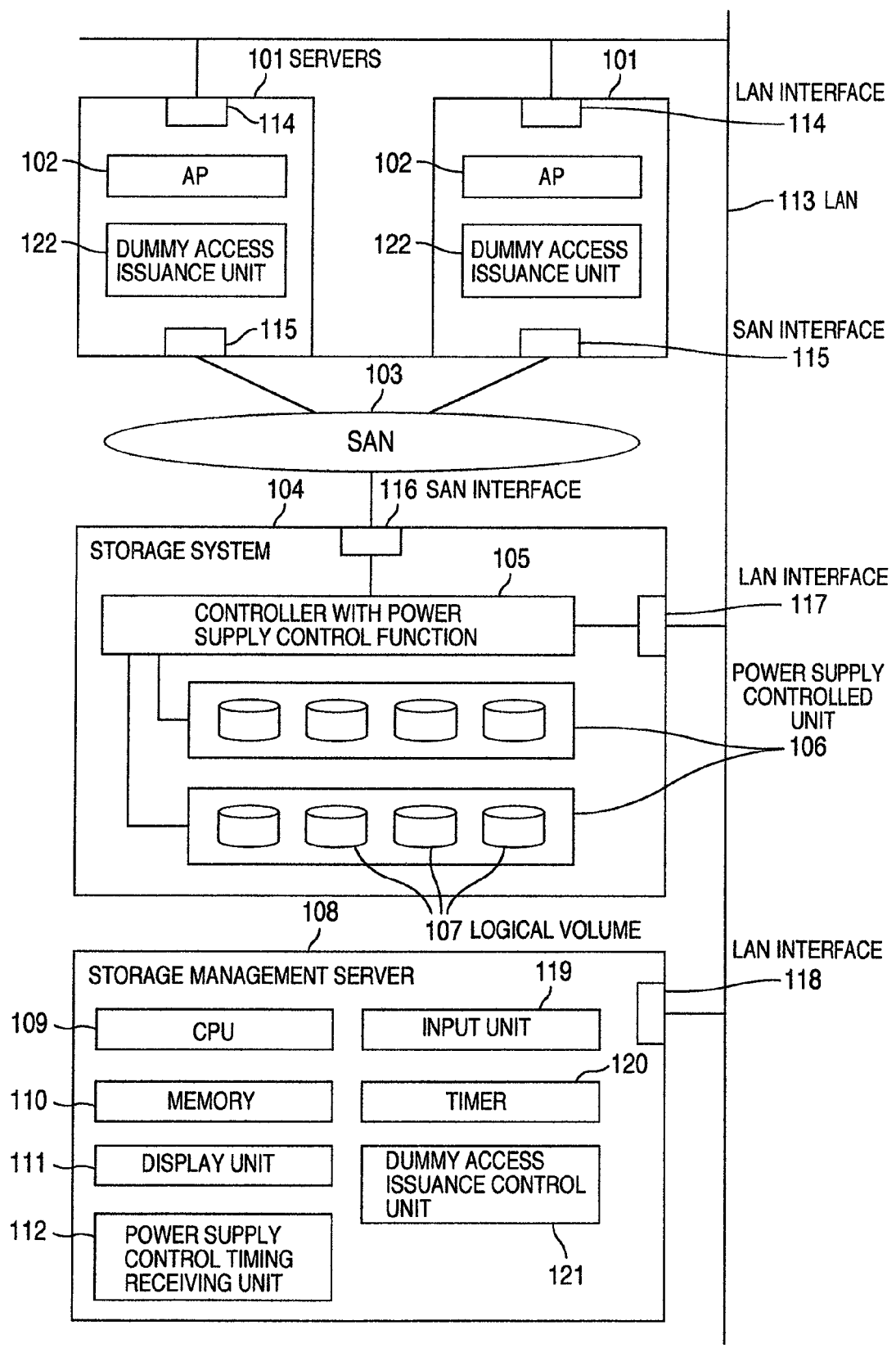
FIG. 1 is a block diagram of the storage system according to a first embodiment of the invention.

FIG. 1 is a block diagram showing a storage system according to the first embodiment of the invention. This storage system is comprised of servers 101, a SAN (Storage Area Network) 103, a storage system 104, a storage management server 108 and a LAN (Local Area Network) 113.

1.1.1. Storage System

The storage system 104 has a controller 105 with a power control function, power controlled units 106, logical volumes 107, a SAN interface 116 and a LAN interface 117.

The controller 105 with a power control function is a control unit for controlling input and output of data between the servers 101 and the logical volumes 107 and controlling the power to the power controlled units 106.

The logical volumes 107 are memory parts which store data in memory areas (storage memory areas) of the storage system 104 and configure one or plural management units for the stored data. The logical volumes 107 are virtually created to actually configure one or plural management units from one or plural physical disks (memory devices such as HDD (Hard Disk Drive)). In FIG. 1, for convenience of explanation, the physical disks are omitted. The server 101 accesses the memory areas of the storage system 104 via the SAN 103 and recognizes the memory areas as the logical volumes 107. At this time, it seems from the viewpoint of the server 101 that the single logical volume 107 configures plural physical disks or the plural logical volumes 107 configure a single physical disk, depending on the specifications of the logical volumes 107.

The power controlled unit (may be indicated as "PCU") 106 which is subject to the power control is comprised of one or plural logical volumes 107 and a unit of power control for a power supply required for operating the physical disk. The power controlled units 106 have the power supply separately controlled by the controller 105 with a power control function. Actually, the power controlled units 106 may be configured to be subjected to the power control in a unit of the physical disk, but FIG. 1 shows that a logical volume is created from the physical disk included in the power controlled units 106, so that it is determined that the control is performed in a unit of the logical volume. It is because optimum power saving can be realized while securing the performance of a resource when the storage system 104 is operated.

The storage system 104 has the SAN interface 116 and is connected to the SAN 103 via the SAN interface 116. In addition, the storage system 104 has the LAN interface 117 and connected to the LAN 113 via the LAN interface 117.

1.1.2. Server

An application program (hereinafter referred to as "AP") 102 operates on the server 101. The server 101 has a SAN interface 115 and is connected to the SAN 103 via the SAN interface 115. The server 101 is connected to the controller 105 with a power control function of the storage system 104 through the SAN 103. The server 101 is connected to the controller 105 with a power control function through another network such as IP-SAN (Internet Protocol-Storage Area Network) or NAS (Network Attached Storage) instead of the SAN 103. And, the server 101 has a LAN interface 114 and is connected to the LAN 113 via the LAN interface 114.

The AP 102 is software to execute single or plural tasks using the memory areas of the storage system 104 which are recognized as the logical volumes 107. It is assumed in this embodiment that one AP 102 is operated on the single server 101, but the plural APs 102 may also be operated. The task executed by the AP 102 is occasionally indicated as the "AP task".

The server 101 has a dummy access issuance unit 122. The dummy access issuance unit 122 issues a dummy access as dummy to access the logical volumes 107 as data read only (Read only, and data writing (Write) is not performed). The AP 102 executes a task using the dummy access.

1.1.3. Storage Management Server

The storage management server 108 has a CPU (Central Processing Unit) 109, a memory 110, a display unit 111, an input unit 119, a timer 120, a dummy access issuance control unit 121, a power control timing receiving unit 112 and a LAN interface 118. The CPU 109 reads and executes a program stored in the memory 110 described later in FIG. 2 to perform various processings. In addition, the CPU 109 shows information requiring interaction with a user in various processing steps on the display unit 111. And, the CPU 109 processes the information input through the input unit 119 through the interaction.

The storage management server 108 is connected to the LAN 113 via the LAN interface 118. The power control timing receiving unit 112 receives power control timing in the power controlled units 106 from the storage system 104 through the LAN 113. The power control timing means a timing of execution of control for power-on or power-off of the individual power controlled units 106. The timer 120 has a timer function to generate time information according to an instruction from the CPU 109. Time to be generated includes the present time, the task execution start time, the task execution end time, the time when a timing of power control is received for each power controlled unit, and the like. And, the dummy access issuance control unit 121 requests the server 101 to issue a dummy access. The storage management server 108 may have a recording medium such as a ROM (Read Only Memory) for recording a program stored in the memory 110.

1.2. Memory Configuration

Figure 2:
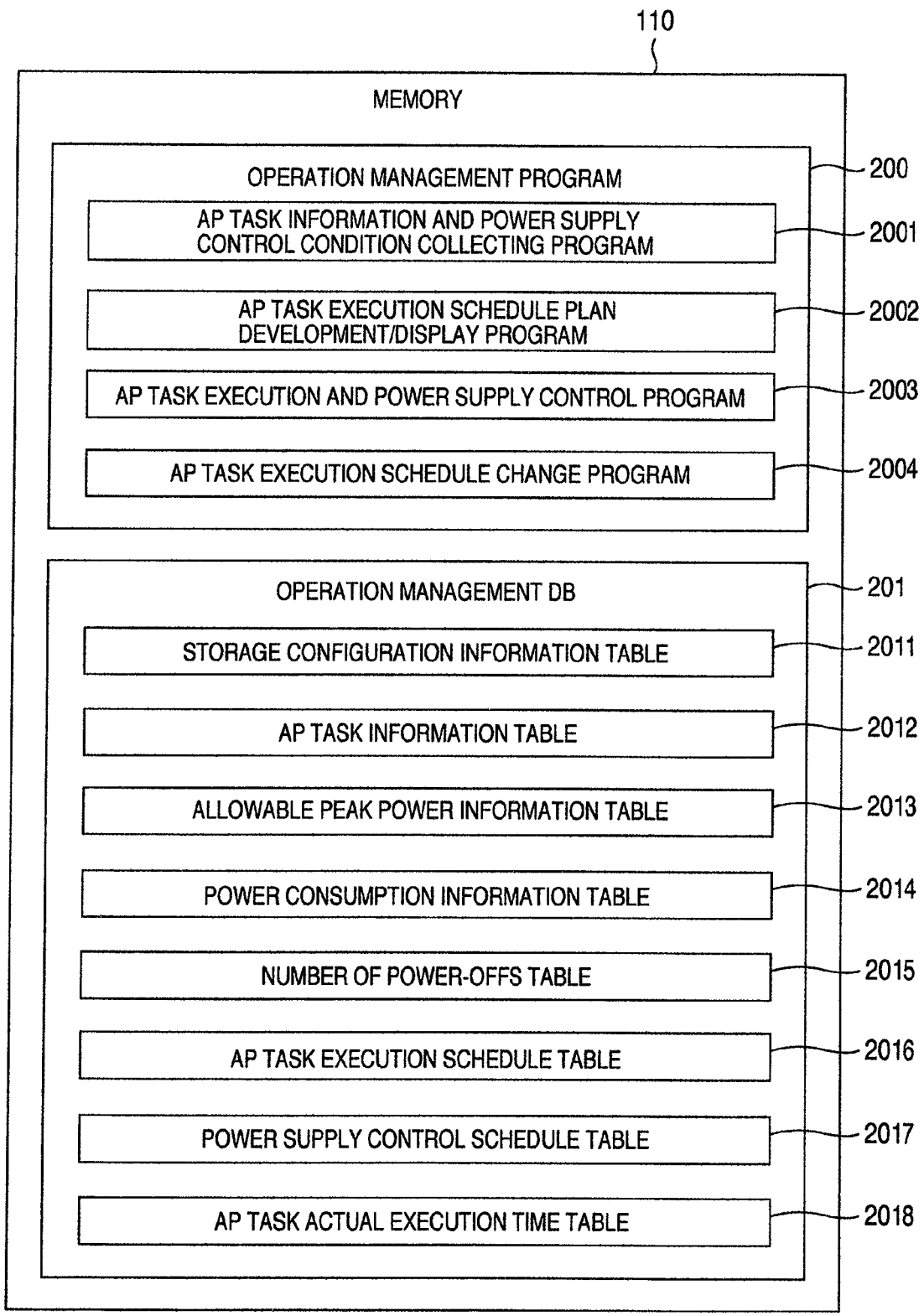
FIG. 2 is a block diagram of a memory on a storage management server according to the first embodiment of the invention.

FIG. 2 is a block diagram of the memory on the storage management server according to the first embodiment of the invention. The memory 110 stores an operation management program 200 and an operation management database (hereinafter referred to as "operation management DB (Data Base)") 201.

The operation management program 200 is comprised of an AP task information and power control condition collecting program 2001, an AP task execution schedule plan development/display program 2002, an AP task execution and power control program 2003 and an AP task execution schedule change program 2004. The operation management DB 201 is comprised of a storage configuration information table 2011, an AP task information table 2012, an allowable peak power information table 2013, a power consumption information table 2014, a number of power-offs table 2015, an AP task execution schedule table 2016, a power control schedule table 2017 and an AP task actual execution time table 2018.

1.2.1. AP Task Information and Power Control Condition Collecting Program

The AP task information and power control condition collecting program 2001 collects from the storage system 104, the servers 101 and the input unit 119 storage configuration information of the storage system 104, information on a task performed by the AP 102 on the server 101, information on the peak power which is information on the maximum power allowable for the storage system 104 as a whole, information on the power consumption of the each power controlled unit 106 and information on the number of power-offs of the each power controlled unit 106 and stores them in the storage configuration information table 2011, the AP task information table 2012, the allowable peak power information table 2013, the power consumption information table 2014 and the number of power-offs table 2015 of the operation management DB 201. Processing by the AP task information and power control condition collecting program 2001 and the individual pieces of information are described in detail later with reference to FIG. 3 to FIG. B.

1.2.2. AP Task Execution Schedule Plan Development/Display Program

The AP task execution schedule plan development/display program 2002 develops power control schedule plans which are power-on or power-off schedules of the individual power controlled units 106 of the AP task execution schedule plan and storage system 104 for the task performed by the AP 102 on the server 101 and stores them in the AP task execution schedule table 2016 and the power control schedule table 2017 in the operation management DB 201. In addition, the individual schedule plans developed are shown on the display unit 111. The processing by the AP task execution schedule plan development/display program 2002 and the individual tables will be described in detail later with reference to FIG. 9 through FIG. 14.

1.2.3. AP Task Execution and Power Control Program

The AP task execution and power control program 2003 requests the server 101 to execute the task to be performed by the AP 102. It also requests the controller 105 with a power control function to power on or power off the power controlled unit. Processing by the AP task execution and power control program 2003 will be described in detail later with reference to FIG. 15 and FIG. 16.

1.2.4. AP Task Execution Schedule Change Program

The AP task execution schedule change program 2004 updates the schedule on the basis of the timing of the power control received by the power control timing receiving unit 112. Using the timer 120, the AP task execution schedule change program 2004 obtains the task execution start time and end time and determines the actual execution time of the task. The determined actual execution time is stored in the AP task actual execution time table 2018. Where the power control timing is received, the actual execution time of the task is obtained from the AP task actual execution time table 2018. The processing by the AP task execution schedule change program 2004 will be described in detail later with reference to FIG. 16 and FIG. 17.

1.3. System Processing

Then, the processing by the storage system according to the first embodiment of the invention is described. This processing is classified into those performed by the AP task information and power control condition collecting program 2001, the AP task execution schedule plan development/display program 2002, the AP task execution and power control program 2003 and the AP task execution schedule change program 2004 which configure the operation management program 200 and described. The each processing is described in detail below.

1.3.1. AP Task Information and Power Control Condition Collection Processing

Figures 3, 4:
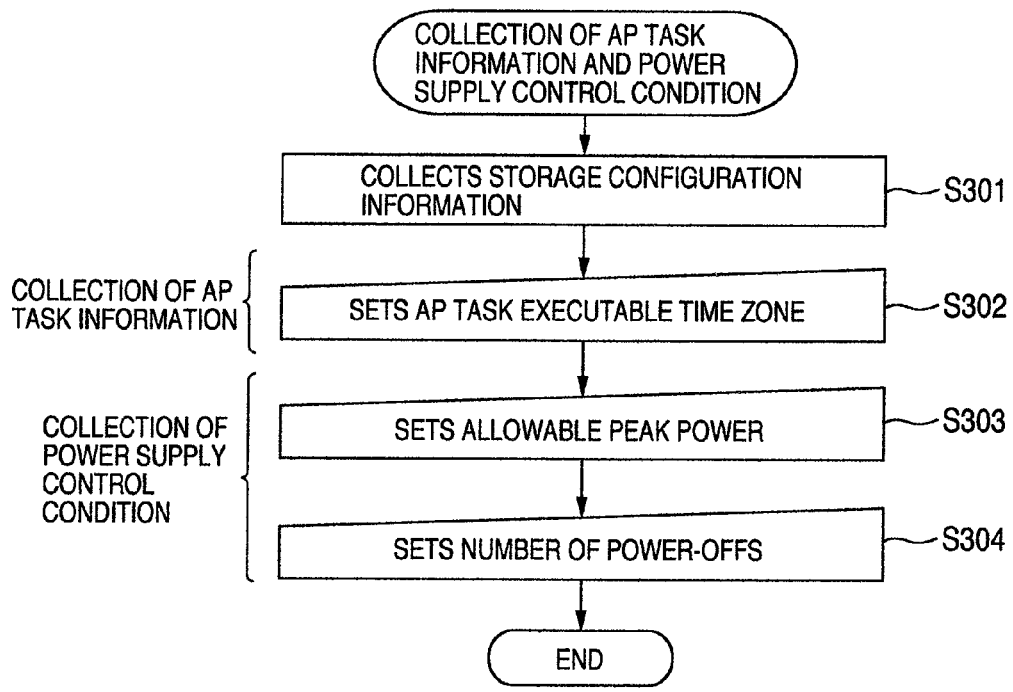
FIG. 3 is a flow chart showing AP task information and power control condition collection according to the first embodiment of the invention.
FIG. 4 shows the contents of a storage configuration information table 2011 according to the first embodiment of the invention.

FIG. 3 is a flow chart showing the AP task information and power control condition collection processing performed by the AP task information and power control condition collecting program 2001 according to the first embodiment of the invention. This flow chart is described below with reference to FIG. 4 through FIG. 8.

The operation management program 200 collects the AP task information and power control condition on an occasion of a change of the configuration of the storage system 104, an increase or decrease in the task performed by the server 101, a change (input of a change through the input unit 119) in a power control plan of the storage system 104 by a user, or the like.

First, the operation management program 200 executes a storage configuration information collecting step (step S301). In the storage configuration information collecting step, the storage configuration information is collected from the storage system 104 and stored in the storage configuration information table 2011. The storage configuration information is information indicating a capacity possessed by the logical volumes 107 of the storage system 104 in order to store data and its belonging power controlled unit 106.

FIG. 4 shows the contents of the storage configuration information table 2011. The storage configuration information table 2011 includes as fields a volume ID (identification) 2011A for uniquely identifying volumes (indicating logical volumes in this embodiment), a capacity 2011B indicating a capacity of a volume storable area, and an assigned power controlled unit ID 2011C of an identifier of the assigned power controlled unit. For example, when it is found that a capacity of the logical volume identified as "0:01" is 10 GB (Giga-Byte) by collecting the storage configuration information from the storage system 104 and the assigned power controlled unit is identified as "1-1-1", the value "0:01" (volume name) is stored in the field of the volume ID 2011A, the value "10 GB" is stored in the field of the capacity 2011B, and the value "1-1-1" (a unit name of the power controlled unit) is stored in the assigned power controlled unit ID 2011C in the storage configuration information table 2011.

Then, the operation management program 200 executes an AP task executable time zone setting step (step S302). In the AP task executable time zone setting step, the task name of the task to be executed by the AP 102 on the server 101 is obtained from the each server 101. In addition, a screen used by the user to set the executable time bands of the individual tasks is shown on the display unit 111 according to the obtained task names.

FIG. 5 shows a screen example used by the user to set the executable time zones of the individual tasks. In this screen example, a time zone executable for each task can be set as one section per day. The screen shows a table including the columns such as "task name", "designated time" and "task executable time zone". In the column of "task name", the task names obtained from the server 101 are sequentially indicated as "task A", "task B", . . . . In the column of "designated time", time zones in which the tasks indicated in the column of "task name", which are designated as executable at the present moment, are indicated. For example, the time zone of the task A designated at the present moment is "17:00 to 6:00" in FIG. 5. In the column of "task executable time zone", a box is provided for each task name so that the user can input through the input unit 119 a time zone in which the task to be set can be executed. The user inputs start and end times of the section indicating the time zone into the box. For example, the start time of the task A executable time zone is input as "17:00" and its end time as "6:00" in FIG. 5.

Another screen example may be one on which another period or plural executable time zones may be set for a single task. Specifically, a screen may be designed to allow setting, for example, two time zones in one week. When the user sets an executable time zone for each task on the screen, the operation management program 200 stores the executable time zone input on the screen into the AP task information table 2012.

FIG. 6 shows the contents of the AP task information table 2012. The AP task information table 2012 includes as fields a task name 2012A which is executed by the AP 102 on the server 101, a use volume ID 2012B which identifies a volume used by a task, a start time 2012C of a task executable time zone, an end time 2012D of the task executable time zone and a required time 2012E which is a time required to execute a task for each volume used by the task.

The task name 2012A stores the task name obtained from the server 101 in this step. And, the use volume ID 2012B stores the ID of the volume used by the task obtained from the server 101. The start time 2012C and the end time 2012D store the values input by the user on the screen for setting the task executable time zones (see FIG. 5). And, the required time 2012E is stored by connecting the use volume ID 2012B and the volume ID 2011A of the storage configuration information table 2011 (see FIG. 4) to obtain a capacity of a use volume and estimating the execution time from the obtained capacity. Here, it is determined that the execution time is estimated from the capacity, but the (actual) execution time may be calculated by, for example, actually monitoring the execution of a task which is performed by the AP 102 on the server 101 to obtain the start and end times of the task from the timer 120. Thus, the task management information indicating which logical volume 107 is used to execute the task is generated for the individual tasks.

FIG. 6 is described specifically. It is assumed that the use volume IDs of the logical volumes 107 used for the task A are "0:01" and "0:04", and the task executable time zone is set to be "17:00 to 6:00" by the user through the input unit 119. In this case, a capacity for the logical volumes of "0:01" and "0:04" is "10 GB" by referring to the capacity 2011B of the storage configuration information table 2011 (see FIG. 4), so that the execution time becomes one hour for both of them. For ease of explanation, execution time is estimated to be one hour for the capacity of 10 GB, and execution time is estimated to be two hours for the capacity of 20 GB. Therefore, for a record of "task A" of the AP task information table 2012, a value "task A" is stored in the field of the task name 2012A, values "0:01" and "0:04" are stored in the field of the use volume ID 2012B, a value "17:00" is stored in the field of the start time 2012C, a value "6:00" is stored in the field of the end time 2012D, and values "one hour" (corresponding to "0:01") and "one hour" (corresponding to "0:04") are stored in the field of the required time 2012E.

Figure 7:
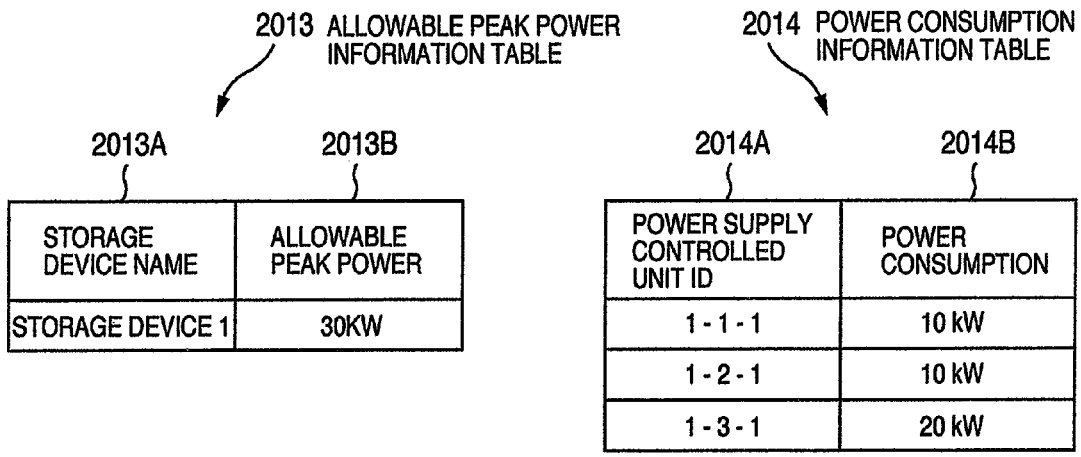
FIG. 7 shows an overview of an allowable peak power setting step performed by an operation management program 200 according to the first embodiment of the invention.

Then, the operation management program 200 performs an allowable peak power setting step (step S303). FIG. 7 shows an overview of the allowable peak power setting step performed by the operation management program 200. In the allowable peak power setting step, the operation management program 200 shows on the display unit 111 a setting screen used by the user to set the allowable peak power information. In this embodiment, the allowable peak power which is allowable for the power consumption of each power controlled unit 106 and the storage system 104 as a whole can be set. Here, the "allowable" means that the storage system 104 can be operated stably.

The screen shows a table having columns of "power controlled unit" and "power consumption (kW)", and boxes in which allowable peak power values can be set through the input unit 119. The unit names of power controlled units obtained from the storage system 104 are sequentially indicated as "1-1-1", "1-2-1", . . . in the "power controlled unit" column. The "power consumption (kW)" column is provided with the boxes in which the values of power consumed by the power controlled unit indicated in the "power controlled unit" column can be set through the input unit 119. For example, the power consumption (kW) by the power controlled unit identified as "1-1-1" is input as "10" and an allowable peak power value (kW) is input as "30" in FIG. 7.

On the screen, the user sets allowable peak power through the input unit 119, and the operation management program 200 stores the power consumption of each power controlled unit input on the screen and the allowable peak power which is allowable for the storage system 104 as a whole into the allowable peak power information table 2013 and the power consumption information table 2014, respectively.

In FIG. 7, the allowable peak power information table 2013 includes as fields a subject storage system name 2013A on which the allowable peak power is set and a set allowable peak power 2013B.

In the field of the storage system name 2013A, the device name (e.g., "device 1") of the storage system configuring the storage system of this embodiment is stored in this step. And, a value (e.g., "30 kW") input by the user on the setting screen (see FIG. 7) is stored in the field of the allowable peak power 2013B.

In FIG. 7, the power consumption information table 2014 includes as fields a power controlled unit ID 2014A which is an identifier of the power controlled units 106 on which the power consumption is set and a power consumption 2014B which is the power consumption set by the user on the screen for setting the allowable peak power information.

In the field of the power controlled unit ID 2014A, the unit name (e.g., "1-1-1") of the power controlled unit is stored in this step. And, the value (e.g., "10 kW") input by the user is stored for each power controlled unit into the field of the power consumption 2014B on the setting screen (see FIG. 7).

In this embodiment, the power consumption of the individual power controlled units 106 is obtained when the user inputs through the input unit 119, but it may also be obtained by providing the storage management server 108 with a means for monitoring the power consumption of the power controlled units 106.

Figure 8:
FIG. 8 shows an overview of a power-off frequency setting step performed by the operation management program 200 according to the first embodiment of the invention.

Then, the operation management program 200 performs a number of power-offs setting step (step S304). FIG. 8 shows an overview of the number of power-offs setting step performed by the operation management program 200. In the number of power-offs setting step, the operation management program 200 shows on the display unit 111 the setting screen used by the user to set the number of power-offs. In this embodiment, a limit value of the number of power-offs per day of the each power controlled unit 106 can be input.

The screen shows columns of "power controlled unit" and "number of power-offs (times/day)". In the column of "power controlled unit", the unit names of the power controlled units obtained from the storage system 104 are sequentially indicated as "1-1-1", "1-2-1", . . . . The column of "number of power-offs (times/day)" is provided with boxes in which values of the number of power-offs of the power controlled unit indicated in the column of "power controlled unit" can be set through the input unit 119. For example, the number of power-offs (times/day) of the power controlled unit identified as "1-1-1" is input as "1" in FIG. 8.

When the user sets the number of power-offs on the screen, the operation management program 200 stores the number of power-offs of the each power controlled unit input on the screen into the number of power-offs table 2015.

In FIG. 8, the number of power-offs table 2015 includes as the fields a power controlled unit ID 2015A which is an identifier of the power controlled units 106 on which the number of power-offs is set and a number of power-offs 2015B which is the number of power-offs set on the screen used by the user to set the number of power-offs.

In the field of the power controlled unit ID 2015A, the unit name (e.g., "1-1-1") of the power controlled unit is stored in this step. And, the value (e.g., "one time") input for the each power controlled unit on the setting screen by the user is stored into the field of the number of power-offs 2015B (see FIG. 8).

Thus, the AP task information and power control condition collection processing is terminated.

1.3.2. Schedule Plan Development Processing

Figure 9:
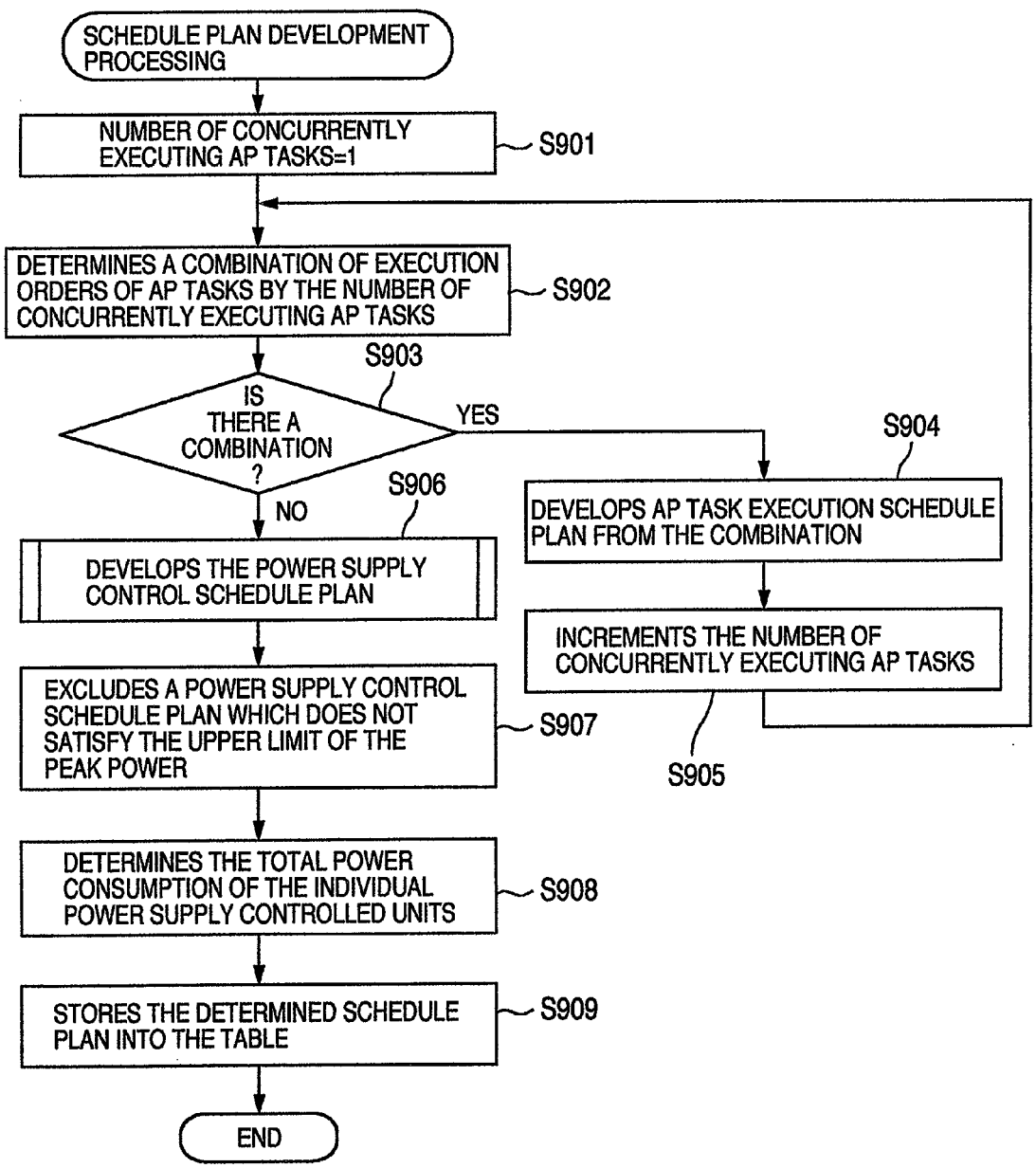
FIG. 9 is a flow chart showing schedule plan development processing according to the first embodiment of the invention.

FIG. 9 is a flow chart showing schedule plan development processing performed by the schedule plan development/display program 2002 according to the operation management program 200 of the first embodiment of the invention. According to this flow chart, on the basis of information on the power consumption of the each power controlled units 106 collected by the AP task information and power control condition collecting program 2001 and the limited value of the number of power-offs per day of the each allowable peak power and power controlled unit 106 allowable by the storage system as a whole, the AP task execution and power control are scheduled to satisfy the above conditions. For example, this schedule plan development processing is performed when the user instructs the development of the schedule plan through the input unit 119.

First, a schedule plan is developed with the number of AP tasks to be executed simultaneously (hereinafter referred to as "number of concurrently executing AP tasks") in the developed schedule plan determined to be 1 (step S901). Here, the number of concurrently executing AP tasks indicates that the schedule plan to be developed includes at least one combination of tasks to be executed at the same time by that number.

In step S902, a combination of execution orders of executable AP tasks is determined by the number of concurrently executing AP tasks of the step S901. At this time, the start and end times of the executable time zone of the each AP task are obtained from the field of the start time 2012C and the field of the end time 2012D by referring to the AP task information table 2012 (see FIG. 6), and the combination of the execution orders when executed in the executable time zone is determined.

Then, it is judged whether there is a combination determined in the step S902 (step S903). If judged "No", the procedure goes to step S906, and if judged "Yes", the procedure goes to step S904. First, the shift to the step S904 will be described assuming that it was judged "Yes".

In the step S904, the combinations created in the step S902 are arranged in the AP task execution order in the executable time zone of the individual AP tasks, and the AP task execution schedule plan is developed from the combinations of the AP tasks arranged. At this time, the required time of each AP task per volume is obtained from the field of the required time 2012E by referring to the AP task information table 2012 (see FIG. 6), and those other than AP tasks to be executed at the same time are arranged not to be executed during the execution time of the AP tasks. In addition, they are arranged to be close to each other in the executable time zones of the individual AP tasks so that there is no time when any AP task is not executed as much as possible.

Then, the number of concurrently executing AP tasks is incremented (1 is added) (step S905). After the step S905 is completed, the procedure goes to the step S902 again. After that, the processings from the step S902 to step S905 are sequentially repeated for the cases that the number of concurrently executing AP tasks is 2, 3, . . . , a combination of the AP task execution orders of the individual cases is determined, and the AP task execution schedule plan is developed according to the combination.

Then, it is assumed that the judgment is "No" when the presence of the combination developed in the step S902 is judged (step S903), the procedure moves to the step S906. If the number of concurrently executing AP tasks exceeds the number of the AP tasks configuring the combination, namely the number of the task names stored in the field of the task name 2012A of the AP task information table 2012, such a combination is not achievable, and it is judged in the step S903 that there is not a combination ("No"), and the procedure moves to the step S906. Even if the number of concurrently executing AP tasks is equal to or less than the number of AP tasks configuring the combination, there is a case that a particular combination might become unrealizable depending on when is the executable time zone of the AP task (see FIG. 11A).

In the step S906, a power control schedule plan is determined so that the condition of the number of power-offs of the each power controlled units 106 is satisfied and the power-off time becomes largest for the AP task execution schedule plan of each combination of execution orders created in the step S904. Here, the number of power-offs of the each power controlled unit 106 is obtained from the field of the number of power-offs 2015B with reference to the number of power-offs table 2015 (see FIG. 8). Therefore, even if the AP task is not executed in a certain period of a certain power controlled unit, the life of the physical disk is taken into consideration if the number of power-offs is exceeded, and the power control schedule plan is developed so as to activate the power.

Figure 10:
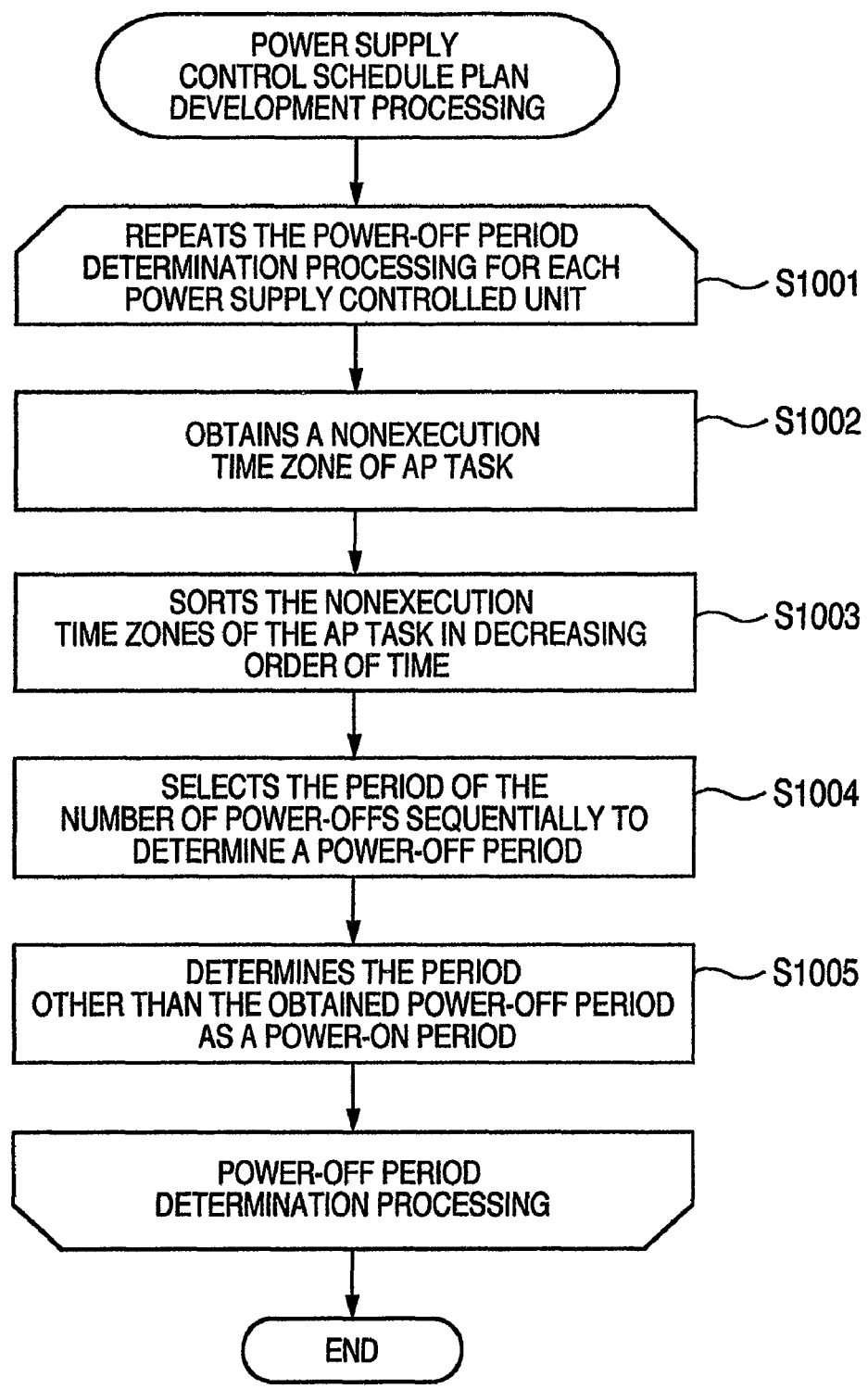
FIG. 10 is a flow chart showing power control schedule plan development processing according to the first embodiment of the invention.

Here, the power control schedule plan development processing for developing the above-described power control schedule plan will be described in detail. FIG. 10 is a flow chart showing the power control schedule plan development processing according to the first embodiment of the invention. Here, a loop processing to repeat from step S1002 to step S1005 is executed for the each power controlled unit (step S1001).

In the step S1002, a nonexecution time zone which is a nonexecution time zone of the AP task is obtained in the subject power controlled unit from the AP task execution schedule plan developed in the step S904 (see FIG. 9).

In step S1003, the nonexecution time zones of the AP task obtained in the step S1002 are rearranged by sorting in decreasing order of time.

In step S1004, the period of the number of power-offs is sequentially selected from the period having a longer nonexecution time zone of the AP tasks rearranged in the step S1003, and the selected period is determined as "power-off period".

In the step S1005, the period other than the power-off period selected in the step S1004 is determined to be "power-on period". After the each period is determined as described above, the power control schedule plan for the subject power controlled unit is developed.

This processing is terminated after the power control schedule plan is developed for all the power controlled units.

But, when there is a period in which there is no access of a task and the power-on is required and the power control function of the storage system 104 is not accessed for a prescribed period, there is a case that the power supply to the power controlled units 106 is stopped depending on the developed power control schedule plan, namely the power-on or power-off of the power controlled units 106 cannot be controlled by the outside storage management server 108. In this case, for a period that there is no access from a task and the power supply is required to be activated, a task to perform a (read only) dummy access issued from the dummy access issuance unit 122 is registered in the power control schedule plan. The task to perform the dummy access is performed in an interval shorter than a prescribed period before the storage system 104 is powered off. The dummy access issuance control unit 121 instructs the dummy access issuance unit 122 the issue of a dummy access and the interval of dummy accesses performed by the task.

Back to FIG. 9, the description is continued. In step S907, the peak power is determined for the power control schedule plan developed in the step S906, and a power control schedule plan which does not satisfy the allowable peak power which is the upper limit of the peak power is excluded. Here, the peak power is determined by a total sum of power consumption of the power controlled units 106 which are simultaneously active in a prescribed period. The power consumption of the each power controlled unit 106 is obtained from the field of the power consumption 2014B with reference to the power consumption information table 2014 (see FIG. 7). In addition, the allowable peak power of the storage system 104 as a whole is obtained from the field of the allowable peak power 2013B with reference to the allowable peak power information table 2013 (see FIG. 7).

In step S908, the total power consumption of the individual power controlled units is determined from the power control schedule plan developed in the step S906. Here, the total power consumption is determined by a total sum of the products of the power consumption of the individual power controlled units 106 and the total activation time. The power consumption of the each power controlled unit 106 is obtained from the field of the power consumption 2014B with reference to the power consumption information table 2014 (see FIG. 7). In addition, the total activation time of the individual power controlled units 106 is obtained from the power control schedule plan developed in the step S906.

In step S909, the AP task execution schedule plan and the power control schedule plan developed from the step S901 to the step S906 are respectively stored in the AP task execution schedule table 2016 and the power control schedule table 2017.

Thus, the schedule plan development processing is terminated. The peak power determined in the step S907 and the total power consumption determined in the step S908 are used as evaluation value for evaluation of the schedule plan developed by the schedule plan development processing. This evaluation value is shown together with the schedule plan to be shown so to be selected by the user. Referring to the shown evaluation value, the user can easily select a schedule plan optimum for power saving on the basis of the storage environmental states. And, to show a schedule plan using the evaluation value as an index, the storage management server 108 can show the schedule plan by appropriately rearranging in, for example, ascending order of the total power consumption or ascending order of the peak power.

FIG. 12 is a diagram showing the AP task execution schedule table 2016. The AP task execution schedule table 2016 includes as fields a plan 2016A which is a name of the AP task execution schedule plan, a task 2016B which is a task name having performed the scheduling, a start time 2016C which is a start time of the task execution time of the scheduled task and an end time 2016D which is an end time of the task execution time of the scheduled task.

FIG. 12 will be described specifically. For all the tasks (task A, task B, task C and task D) stored in the AP task information table 2012 (see FIG. 6), all realizable AP task execution schedule plans are developed. At this time, the plans are sequentially developed as "plan 1", "plan 2", . . . and stored in the field of the plan 2016A. Focusing on "plan 3", the values of "task A", "task B", "task C" and "task D" are stored as task names of the subject tasks in the fields of the task 2016B. For the task A, the task B, the task C and the task D, values of "1:00", "23:00", "0:00" and "3:00" are stored as start times of the tasks in the fields of the start time 2016C. And, for the task A, the task B, the task C and the task D, values of "2:00", "2:00", "1:00" and "4:00" are stored as the end times of the tasks in the fields of the end time 2016D.

And, FIG. 13 is a diagram showing the power control schedule table 2017. The power control schedule table 2017 includes as fields a plan 2017A which is a name of a power control schedule plan, a power controlled unit ID 2017B which uniquely shows a power controlled unit having performed the scheduling, a start-up time 2017C which is a start-up time of a power-on period of the each scheduled power controlled unit 106, a power-off time 2017D which is a power-off time of a power-off period of the each scheduled power controlled unit 106, a number of power-offs 2017E which is a number of power-offs of the each scheduled power controlled units 106, total power consumption 2017F which is the total power consumption of the each developed power control schedule plan, and peak power 2017G which is the peak power of the each developed power control schedule plan.

FIG. 13 is described below specifically. For all the plans ("plan 1", "plan 2", "plan 3", . . . ) stored in the fields of the plan 2016A of the AP task execution schedule table 2016 (see FIG. 12), the power control schedule plan is developed. At this time, the values of the "plan 1", the "plan 2", the "plan 3", . . . which are all the plans stored in the fields of the plan 2016A are stored in the fields of the plan 2017A. Focusing on the "plan 3", in the fields of the power controlled unit ID 2017B, values of "1-1-1", "1-2-1" and "1-3-1" are stored as power controlled unit IDs which uniquely show the power controlled units (see the storage configuration information table 2011 of FIG. 4 and the AP task information table 2012 of FIG. 6) to which are belonged the volumes used by the task names ("task A", "task B", "task C" and "task D") stored in the "plan 3" of the field of the plan 2017A. And, values of "1:00", "23:00" and "23:00" are stored as the start-up times of the power controlled units represented by "1-1-1", "1-2-1"

and "1-3-1" in the field of the start-up time 2017C. And, values of "4:00", "2:00" and "1:00" are stored as the power-off times of the power controlled units represented by "1-1-1", "1-2-1" and "1-3-1" in the field of the power-off time 2017D. In the field of the number of power-offs 2017E, the same values ("one time" for power controlled units indicated by "1-1-1", "1-2-1", "1-3-1") as those stored in the number of power-offs table 2015 (see FIG. 8) for the individual power controlled units are stored. And, in the field of the total power consumption 2017F, a value of "100 kW" is stored as the total power consumption determined in the step S908. In the field of the peak power 2017G, a value of "30 kW" is stored as the peak power possibly produced in the power-on period determined in the step S1005.

Thus, for the AP task execution schedule table 2016 and the power control schedule table 2017, the storage of the prescribed values is completed, and this schedule plan development processing is terminated.

A specific example of this schedule plan development processing is described with reference to FIG. 11A and FIG. 11B. The individual AP tasks have a task executable time zone (see the AP task information table 2012 of FIG. 6). The volume used by the each AP task uses each power controlled unit (PCU). The each AP task has an execution time required for execution. For example, the "task A" in FIG. 11A has a time zone executable between 17:00 and 6:00 and uses the power controlled units 1-1-1 and 1-2-1. In addition, it indicates that a necessary time for execution of the task A is one hour (1 h). According to the information of the above AP tasks, a combination of the execution order of the executable AP tasks is determined. The combination is determined by sequentially increasing the number of concurrently executing AP tasks from 1.

In FIG. 11A, a combination when the number of concurrently executing AP tasks is 2 is determined. For example, the combination of {[task B, task C], task A, task D} (1101) in FIG. 11A indicates a combination that the task B and the task C are executed at the same time, then the task A is executed, and the task D is executed last. And, a combination such as {[task D, task C], [task B, task A]} (1102) is excluded because it is unexecutable in the task executable time zone of the individual AP tasks (task executable time zone "3:00 to 6:00" of the task D is present behind an executable time zone "18:00 to 1:00" of the task B). Actually, a combination is determined with all the numbers of concurrently executing AP tasks having the combinations. The AP task execution schedule plan is developed from the determined combination. At this time, the execution time between the AP tasks is made closer for arrangement within the task executable time zone of the each AP task.

Figure 11B:
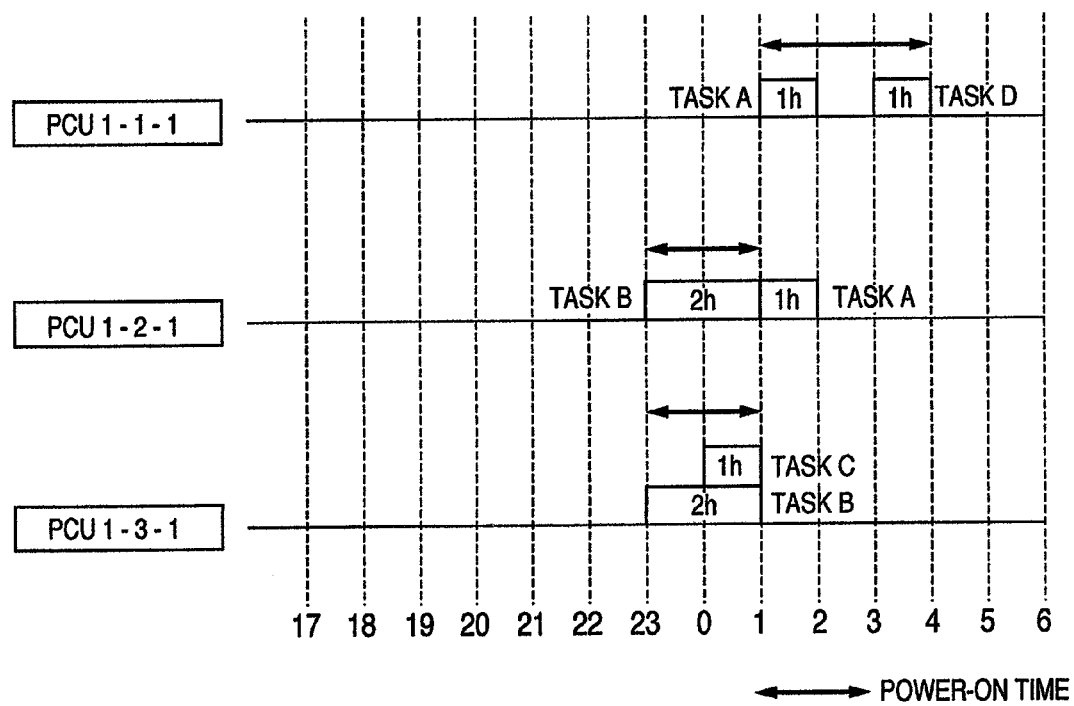
FIG. 11B is part two of the diagram showing a specific example of schedule plan development processing according to the first embodiment of the invention.

FIG. 11B shows an example of developing a power control schedule plan by arranging in order of {[task B, task C], task A, task D} which are mutually approached in the task executable time zone of the each AP task. Here, those not satisfying the allowable peak power are excluded from the developed power control schedule plan (see the step S907 in FIG. 9). From the determined AP task execution schedule plan, a power control schedule plan is developed so that the condition of the number of power-offs of the each power controlled unit is satisfied, and the power-off time becomes largest. A power control schedule plan is developed so that the upper limit 1 of the number of power-offs of the each power controlled unit is satisfied, and the power-off period becomes longest in FIG. 11B. For example, in FIG. 11B, the power controlled unit 1-1-1 has the upper limit 1 of the number of power-offs and the longest period of from 4:00 to 1:00 as the period of task nonexecution, so that it is stopped during this period. Conversely, it is activated for a period of from 1:00 to 4:00. Therefore, the power controlled units 1-1-1, 1-2-1 and 1-3-1 are activated for the periods from 1:00 to 4:00, from 23:00 to 2:00 and from 23:00 to 1:00 respectively in FIG. 11B.

Here, in a case where there is a period that there is no access of a task and it is necessary to keep the power supply ON, and the power-on or power-off of the power controlled units 106 cannot be controlled by the outside storage management server 108, a task of performing a read-only dummy access is registered in the power control schedule plan. For example, a task to perform a dummy access between 2:00 and 3:00 in the power controlled unit 1-1-1 is registered in FIG. 11B. As described above, the AP task execution schedule and the power control schedule of the power controlled unit are developed.

By performing the above-described schedule plan development processing, a schedule plan, which satisfies the task executable time zone of the AP task required for the AP task, allowable peak power which is allowed by the storage system 104 as a whole as a condition of power control, and the limit value of the number of power-offs per day of the each power controlled unit 106, can be developed.

FIG. 14 is a diagram showing a screen example for presentation and selection of the AP task execution schedule plan which is shown by the display unit 111 according to the AP task execution schedule plan development/display program 2002 of the first embodiment of the invention. This screen shows a table having columns of "task execution schedule", "power control schedule", "total power consumption" and "peak power" for the schedule plans indicated as "plan 3" and "plan 1" by obtaining the schedule plans developed by the schedule plan development processing of FIG. 9 from the AP task execution schedule table 2016 of FIG. 12 and the power control schedule table 2017 of FIG. 13. The column of "power control schedule" also includes a table classified into columns of "power controlled unit", "power-on period" and "number of power-offs".

Here, to show this screen by the operation management program 200, the schedule plans are rearranged in view of the power consumption and shown in the rearranged order. Thus, the user can select the AP task execution schedule plan and the power control schedule plan to decrease the power consumption. Specifically, the screen is shown with rearrangement made according to the total power consumption or peak power or the number of power-offs of the individual schedule plans.

In this screen example, the schedule plans are rearranged and shown in ascending order of the total power consumption. The total power consumption of the "plan 3" is "100 kW", and that of the "plan 1" is "120 kW". Therefore, the "plan 3" and the "plan 1" are shown in this order in FIG. 14. And, the AP task execution and power controlled unit is controlled on the basis of the schedule plan selected by the user through the input unit 119 on the screen. In FIG. 14, the "plan 3" is selected by using a radio button.

1.3.3. AP Task Execution and Power Control Processing

Figure 15A:
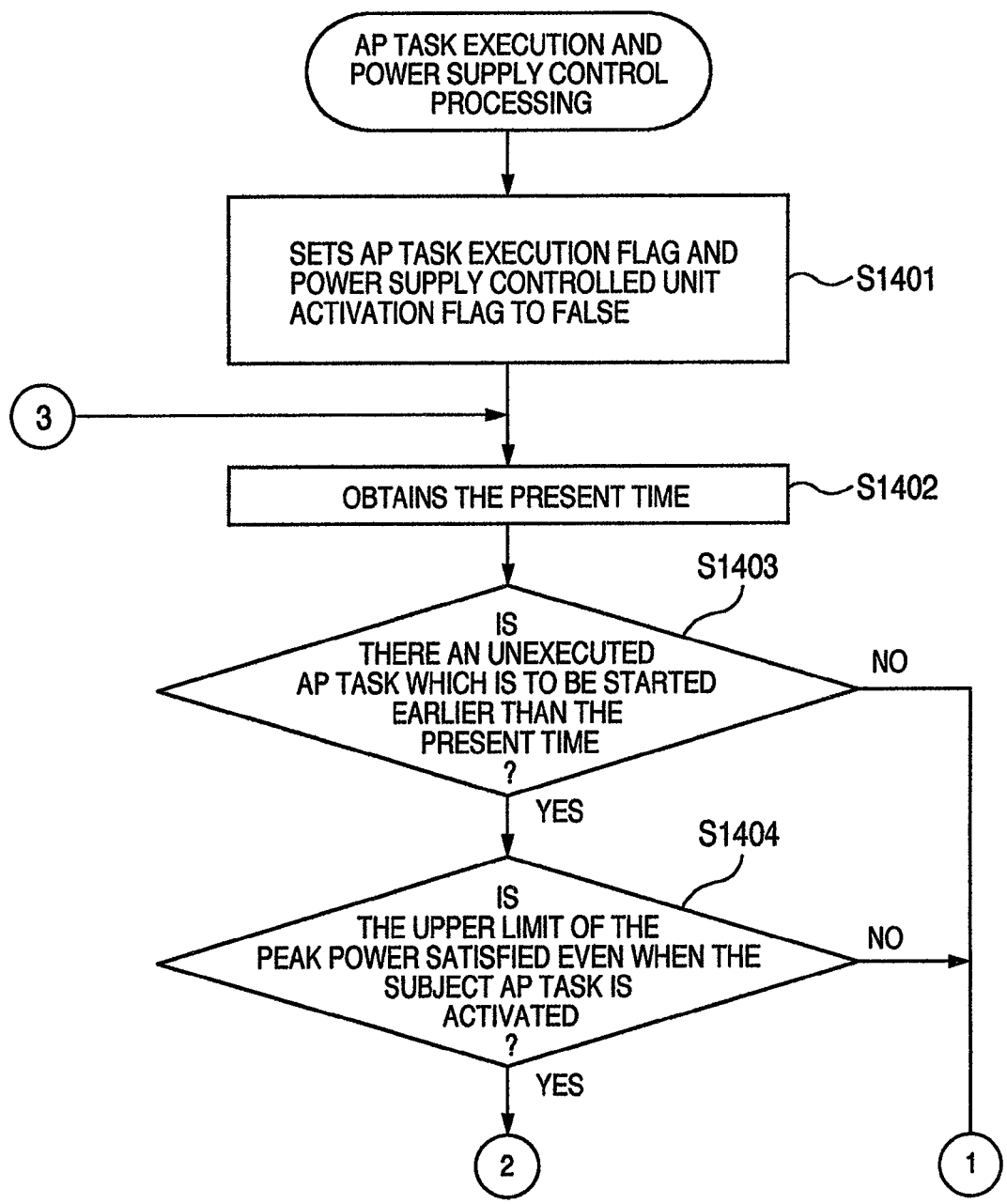
FIG. 15A is part one of a flow chart showing AP task execution and power control processing according to the first embodiment of the invention.
Figure 15B:
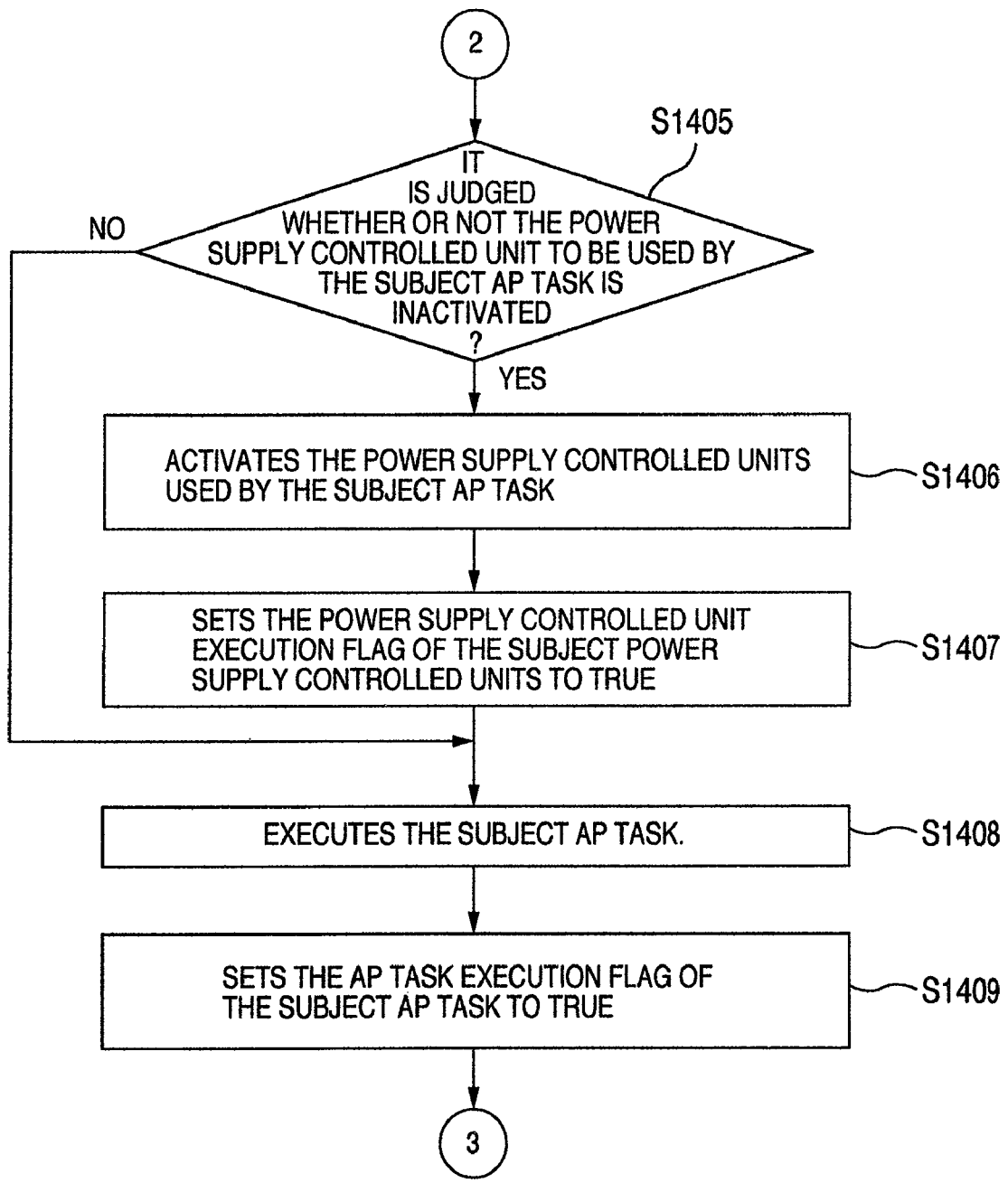
FIG. 15B is part two of the flow chart showing the AP task execution and power control processing according to the first embodiment of the invention.
Figure 15C:
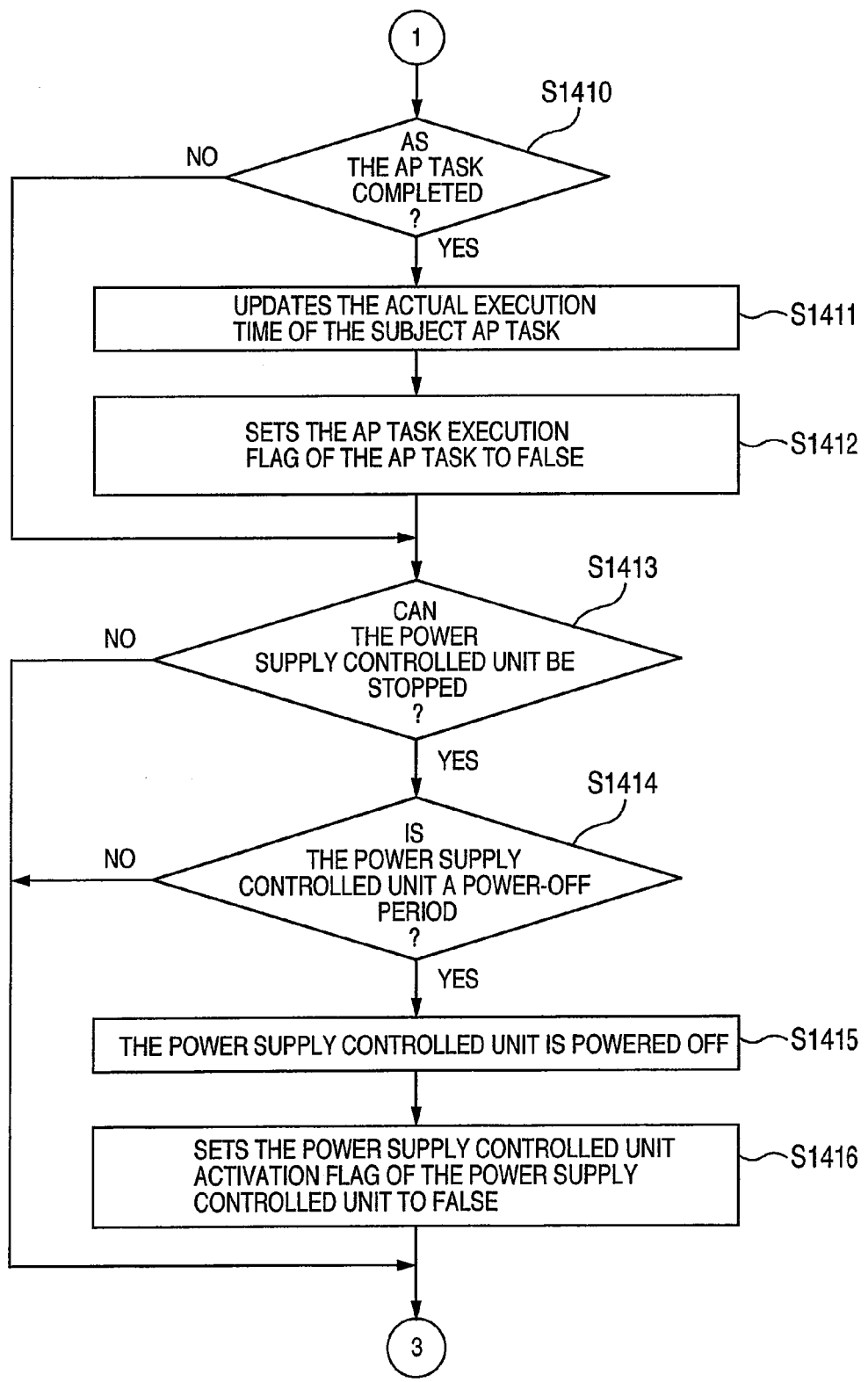
FIG. 15C is part three of the flow chart showing the AP task execution and power control processing according to the first embodiment of the invention.

FIG. 15A, FIG. 15B and FIG. 15C are flow charts showing an AP task execution and power control processing performed by the AP task execution and power control program 2003 according to the operation management program 200 of the first embodiment of the invention. This processing is executed by the operation management program 200 on the basis of the schedule plan selected by the user through the input unit 119 on a screen for presentation and selection of the AP task execution schedule plan of FIG. 14. For example, this processing is performed by the operation management program 200 when the selection by the user is completed on the screen for presentation and selection of the AP task execution schedule plan of FIG. 14.

First, an AP task execution flag indicating whether the AP task, which corresponds to the plan stored in the AP task execution schedule table 2016 (see FIG. 12) and is selected by the user, is executing or not and a power controlled unit activation flag indicating whether a power controlled unit to which a volume used by the AP task belongs is being activated or not are set to FALSE (step S1401). The AP task execution flag is "TRUE" when the AP task is being executed and "FALSE" when it is not being executed. The power controlled unit activation flag is "TRUE" when the power controlled unit is activating, and "FALSE" when it is not.

Then, the present time is obtained from the timer 120 (step S1402).

Subsequently, it is judged whether the unexecuted AP tasks include a task which is to be started earlier than the present time (step S1403). Namely, it is judged whether the AP task execution flag set in the step S1401 is FALSE and the AP task obtained in the step S1402 and to be executed at the present time is present or not. Here, the name of the AP task that the AP task execution flag is FALSE is obtained from the AP task execution schedule table 2016 (see FIG. 12). In addition, the AP task execution schedule table 2016 (see FIG. 12) is referred to by the name of the obtained AP task to judge whether or not there is an AP task that the start time obtained from the field of the start time 2016C is earlier than the present time. If there is, the AP task is an AP task to be executed, it is determined as "Yes", and the procedure moves to step S1404. If there is not, the AP task is an AP task which is not executed yet, it is determined as "No", and the procedure moves to step S1410. Here, it is assumed that the judgment is "Yes", and the procedure moves to the step S1404.

In the step S1404, it is judged whether the upper limit of the peak power is satisfied even when the AP task which is judged to be executed in the step S1403 is activated. The list of the names of the AP tasks that the AP task execution flag is TRUE and the list of volume IDs used by the AP task from the fields of the use volume ID 2012B by obtaining the names of the AP tasks judged to be executed in the step S1403 from the AP task execution schedule table 2016 (see FIG. 12) and referring to the AP task information table 2012 (see FIG. 6) by the name of the AP task are obtained. In addition, the storage configuration information table 2011 (see FIG. 4) is referred to based on the list of the use volume IDs to obtain the list of the assigned power controlled unit IDs from the fields of the assigned power controlled unit ID 2011C. In addition, the power consumption information table 2014 (see FIG. 7) is referred to based on the list of the assigned power controlled unit IDs to obtain the power consumption from the fields of the power consumption 2014B in the list of the power controlled units, and a total sum of the power consumption is determined. And, the allowable peak power stored in the field of the allowable peak power 2013B of the allowable peak power information table 2013 (see FIG. 7) and the total sum of the power consumption stored in the fields of the power consumption 2014B of the list of the determined power controlled units are compared. If the total sum of the power consumption of the determined power controlled unit is smaller than the allowable peak power, it is judged "Yes", and the procedure moves to step S1405, but if it is larger, it is judged "No", and the procedure moves to step S1410. Here, it is assumed that the judgment is "Yes", and the procedure moves to step S1405.

It is judged in the step S1405 whether the power controlled unit to be used by the subject AP task judged to be executed in the step S1403 is inactivated or not. Here, the name of the AP task which is judged to be executed in the step S1403 is obtained from the AP task execution schedule table 2016 (see FIG. 12), and the AP task information table 2012 (see FIG. 6) is referred to by the name of the AP task to obtain the list of the volume ID 2012B used by the AP task from the fields of the use volume ID 2012B. In addition, the storage configuration information table 2011 (see FIG. 4) is referred to on the basis of the list of the use volume IDs to obtain the list of the assigned power controlled unit IDs from the fields of the assigned power controlled unit ID 2011C. In addition, the power controlled unit activation flag of the list of the assigned power controlled unit IDs is checked to obtain the list of the nonexecuted power controlled unit IDs (its activation flag is FALSE). If there is a nonexecuted power controlled unit, it is judged "Yes", and the procedure moves to step S1406, and if there is not, it is judged "No", and the procedure moves to step S1408. Here, it is assumed that the judgment is "Yes", and the procedure moves to the step S1406.

In the step S1406, the power controlled units 106 to which the volume used by the subject AP task judged to be nonexecuted in the step S1405 belongs is powered on. Here, the list of the nonexecution power controlled unit IDs obtained in the step S1405 is used to request the controller 105 with a power control function of the storage system 104 to power on.

Then, the power controlled unit execution flag of the power controlled units 106 activated in the step S1406 is updated to TRUE (step S1407).

After it is judged "No" in the step S1405 or after the step S1407 is completed, the subject AP task which is judged to be executed in the step S1403 is executed in the step S1408. Here, the execution of the AP task is requested to the AP 102 on the server 101 in the name of the AP task judged to be executed in the step S1403. In addition, the present time obtained in the step S1402 is held as the execution start time of the subject AP task.

The AP task execution flag of the AP task executed in the step S1408 is then updated to TRUE (step S1409). After this step is completed, the procedure moves to the step S1402 again.

After it is judged "No" in the step S1403 or judged "No" in the step S1404, it is judged in step S1410 whether the AP task executed in the step S1408 is completed. Here, the execution of the AP task is asked to the AP 102 on the server 101 in the name of the AP task that the AP task execution flag is TRUE. If any of the asked AP tasks is not being executed (namely, all the asked AP tasks are completed), it is judged "Yes", and the procedure moves to step S1411, and if any one of them is being executed (namely, if the asked AP task is not completed), it is judged "NO" and the procedure moves to step S1413. Here, it is assumed that the judgment is "Yes", and the procedure moves to the step S1411.

In the step S1411, actual execution time of the subject AP task which was being executed (AP task execution flag is updated to TRUE) in the step S1409 is updated. Here, for the AP task which was being executed in the step S1409, a difference between the present time obtained in the step S1402 and the execution start time set in the step S1408 is determined as actual execution time, and the value stored in the field of an actual execution time 2018C of the AP task actual execution time table 2018 is updated.

FIG. 16 is a diagram showing the AP task actual execution time table 2018. The AP task actual execution time table 2018 includes as fields a task name 2018A of tasks executed by the AP 102 on the server, a use volume ID 2018B for identification of the volumes used by the tasks, and the actual execution time 2018C for actual execution times of the tasks. Thus, task actual execution time information which indicates a level of actual execution time of the each executed task is generated.

FIG. 16 is described specifically. The values of task names "task A", "task B", "task C" and "task D" of the tasks which are the plans stored in the AP task execution schedule table 2016 (see FIG. 12) and corresponded with those selected by the user are stored as task names of tasks executed by the AP 102 on the server into the fields of the task name 2018A. As to the task A, values "0:01" and "0:04" are stored as volume IDs indicating the volumes used by the task A into the fields of the use volume ID 2018B. And, values "one hour" (corresponding to "0:01") and "one hour" (corresponding to "0:04") are stored according to the actual execution time determined in the step S1411 into the fields of the actual execution time 2018C.

In step S1412, the AP task execution flag of the AP task which was not being executed (completed) in the step S1410 is updated to FALSE.

After it is judged "No" in the step S1410 or after the step S1412, it is judged in the step S1413 whether the power controlled unit can be stopped. Here, for each power controlled unit being executed and having the power controlled unit activation flag of TRUE, the list of the volume IDs is obtained from the fields of the volume ID 2011A included in the power controlled units 106 by referring to the storage configuration information table 2011 (see FIG. 4) by the IDs of the power controlled units. In addition, based on the list of the IDs of the obtained volumes, the list of the task names using the volumes is obtained from the fields of the task name 2012A by referring to the AP task information table 2012 (see FIG. 6). Besides, the AP task execution flags of the tasks in the list of the obtained task names are checked, and if all of them are FALSE, the pertinent power controlled unit is judged as a stoppable power controlled unit, and the ID of the pertinent power controlled unit is added to the list of the stoppable power controlled units. Then, after all the power controlled units are completed, if there is a stoppable power controlled unit, it is judged "Yes", and the procedure moves to step S1414, and if there is not, it is judged "No", and the procedure moves to the step S1402. Here, it is assumed that the judgment is "Yes", and the procedure moves to the step S1414.

It is judged in the step S1414 whether the power controlled unit judged as a stoppable power controlled unit in the step S1413 is a power-off period based on the power control schedule. Here, for each power controlled unit added to the list of the stoppable power controlled unit of the step S1413, a start-up time and a stop time are obtained from the fields of the start-up time 2017C of the power-on period and the fields of the stop time 2017D for the power control schedule which is now being executed, by using the ID of the power controlled unit and referring to the power control schedule table 2017 (see FIG. 13). In addition, if the present time obtained in the step S1402 is not contained between the start-up time and the stop time of the power controlled unit, the pertinent power controlled unit is judged as a stopping power controlled unit, and the ID of the pertinent power controlled unit is added to the list of the stopping power controlled units. In addition, after all stoppable power controlled units are completed, if there is a stopping power controlled unit, it is judged "Yes", and the procedure moves to step S1415, and if there is not, it is judged "No", the procedure moves to the step S1402. Here, it is assumed that the judgment is "Yes", and the procedure moves to the step S1415.

In the step S1415, the power controlled unit judged as a stopping power controlled unit in the step S1414 is powered off. Here, the ID of the power-off unit added to the list of the stopping power controlled unit of the step S1414 is used to request the controller 105 with a power control function of the storage system 104 to power off.

In step S1416, the power controlled unit activation flag of the power controlled unit powered off in the step S1415 is updated to FALSE. After this step is completed, the procedure moves to the step S1402 again.

By repeating the above-described AP task execution and power control processing, the task execution and the power control can be executed based on the schedule plan.

1.3.4. AP Task Execution Schedule Change Processing

Figure 17:
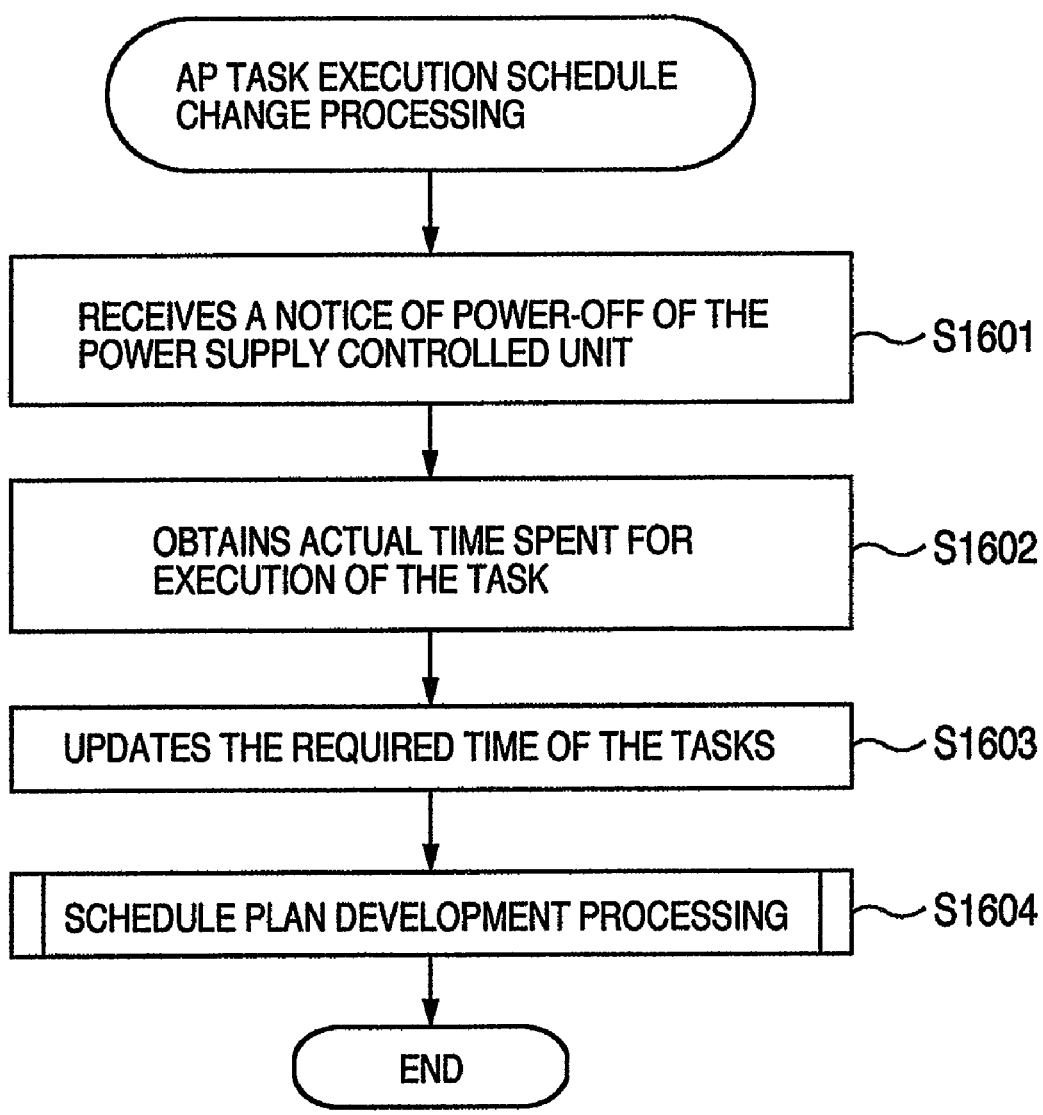
FIG. 17 is a flow chart showing AP task execution schedule change processing according to the first embodiment of the invention.

FIG. 17 is a flow chart showing AP task execution schedule change processing performed by the AP task execution schedule change program 2004 according to the operation management program 200 of the first embodiment of the invention.

First, the operation management program 200 receives a notice of power-off of the power controlled unit from the storage system 104 in step S1601. Here, an ID of the power controlled unit 106 to be powered off is received from the storage system 104. And, the power control timing receiving unit 112 obtains timing (timing of power-off) of the power control from the notice. For example, the notice from the storage system 104 is performed after it is checked by the storage system 104 that the power controlled unit is not operating for a prescribed period.

In step S1602, the actual time spent for execution of the task is obtained. Here, when the timing of the power control is received by the power control timing receiving unit 112, the actual execution time is obtained from the fields of the actual execution time 2018C by referring to the AP task actual execution time table 2018 (see FIG. 16) of each AP task.

In step S1603, the required time of the task is updated. Here, the actual execution time obtained in the step S1602 is used to update the value of the required time (the required time estimated according to the capacity of the used volume) stored in the fields of the required time 2012E in the AP task information table 2012 (see FIG. 6) to its actual execution time.

In step S1604, the schedule plan development processing shown in FIG. 9 is executed based on the information (information determined from the AP task information table 2012 in which the actual execution time is stored (see FIG. 6)) changed in the step S1603.

After the step S1604 is completed, the AP task execution schedule change processing is completed.

By performing the above-described AP task execution schedule change processing, the schedule can be changed dynamically in accordance with the execution of the actual AP task. In addition, based on the changed schedule, the AP task execution and power control processing (FIG. 15A through FIG. 15C) which is performed by the AP task execution and power control program 2003 according to the operation management program 200 is performed, so that the execution of the AP task and the execution of the power control can be performed dynamically in accordance with the execution of the actual AP task.

1.4. Summary of the First Embodiment

The first embodiment provides the following effects. Specifically, there is produced effects that optimum power saving of the storage system which execute plural tasks can be realized under the prescribed conditions such as the task executable time zone, the total power consumption, the peak power and the number of power-on or power-off times by performing the power control by the power controlled unit to which the logical volume belongs.

According to the above-described power control, a schedule plan with attention paid to the task execution schedule and the power control schedule is developed and shown to the user, so that the user can select a convenient schedule plan considering the operating conditions of the storage system.

And, to actually execute the task, the schedule plan can be changed dynamically based on the timing when the power control is performed, and another task can be executed and the power supply can be controlled in accordance with the executed task. Thus, the scheduling efficiency is increased.

2. Second Embodiment

In the first embodiment was described an example that the schedule plan of the task execution and power control was developed, and the task execution and power control were performed based on the developed schedule plan. The second embodiment covers an example of a storage system that the power saving is realized by scheduling more simply and performing the task execution and the power control. In the first embodiment, the optimum schedule plan to realize the power saving of the task was decided through the interaction with the user. This embodiment has a characteristic different from the first embodiment that the scheduling to realize the power saving is performed without the user knowing. Therefore, this embodiment has an advantage that it is easy to conform to a task which does not have an obvious executable time zone, a task of which executable time zone cannot be clearly defined by the user, or tasks which do not depend on the execution order of the tasks. The second embodiment is described mainly on the differences from the first embodiment.

2.1. System Configuration

Figure 18:
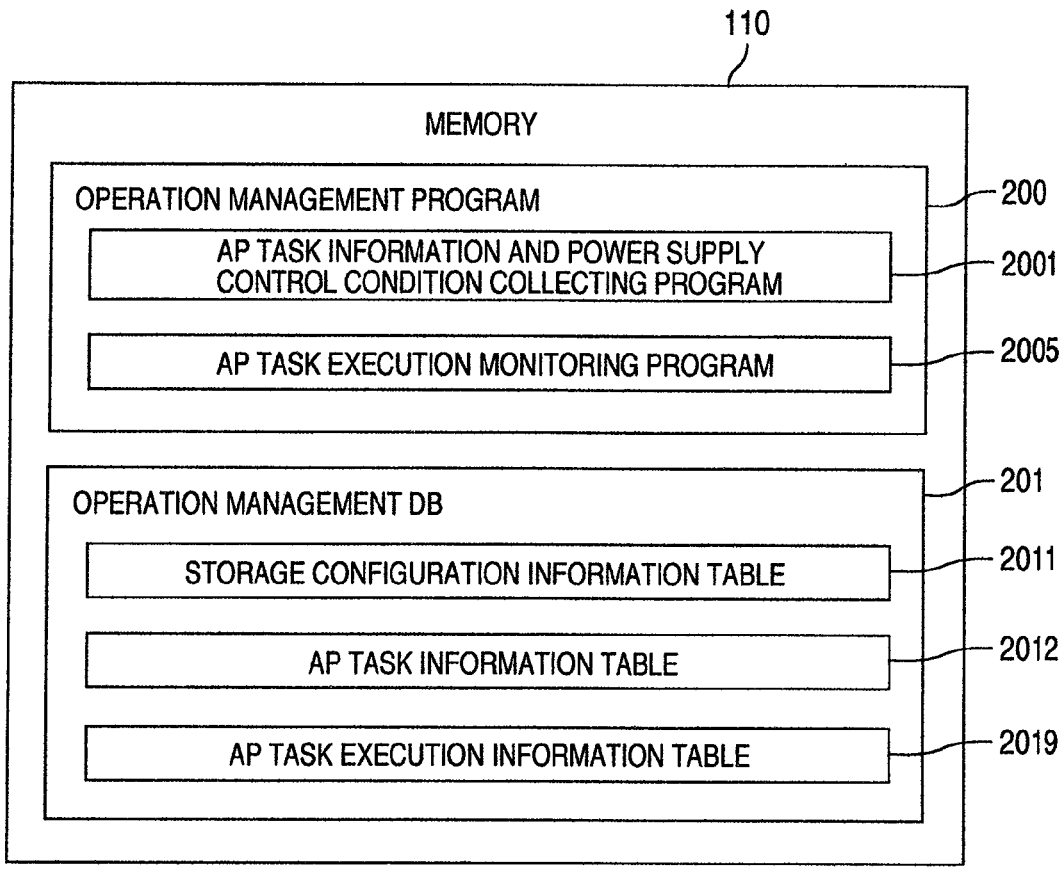
FIG. 18 is a block diagram showing a memory on a storage management server according to a second embodiment of the invention.

FIG. 18 is a block diagram showing a memory on a storage management server according to the second embodiment of the invention. It is different from the first embodiment of the invention on the points that the operation management program 200 does not include the AP task execution schedule plan development/display program 2002, the AP task execution and power control program 2003 and the AP task execution schedule change program 2004 but includes an AP task execution monitoring program 2005, and the operation management DB 201 does not include the allowable peak power information table 2013, the power consumption information table 2014, the number of power-offs table 2015, the AP task execution schedule table 2016 and the power control schedule table 2017, but includes an AP task execution information table 2019 (see FIG. 2).

It is determined in this embodiment that the AP task information table 2012 (see FIG. 6) does not have values of start and end times stored in the fields of the start time 2012C of the executable time zone and the fields of the end time 2012D.

2.1.1. AP Task Information and Power Control Condition Collecting Program

The AP task information and power control condition collecting program 2001 is different from the first embodiment on the points that peak power information which is information on the maximum power allowable for the storage system 104 as a whole and the number of times of power-offs of the power controlled units 106 are not collected, and the AP task execution information is collected and stored in the AP task execution information table 2019. Details of processing of the AP task information and power control condition collecting program 2001 will be described later with reference to FIG. 19 and FIG. 20.

2.1.2. AP Task Execution Monitoring Program

The AP task execution monitoring program 2005 monitors the AP task being executed by the AP 102 on the server 101 and requests the AP 102 of the server 101 to execute the AP task. Details of the processing of the AP task execution monitoring program 2005 will be described later with reference to FIG. 21.

2.1.3. AP Task Execution Information Table

The AP task execution information table 2019 includes information indicating AP task execution states. The contents of the AP task execution information table 2019 are described later with reference to FIG. 20.

2.2. System Processing

Processing of the storage system according to the second embodiment of the invention is described below. For description, this processing is classified to those performed by the AP task information and power control condition collecting program 2001 and the AP task execution monitoring program 2005 which configure the operation management program 200. Details of each processing are described below.

Figure 19:
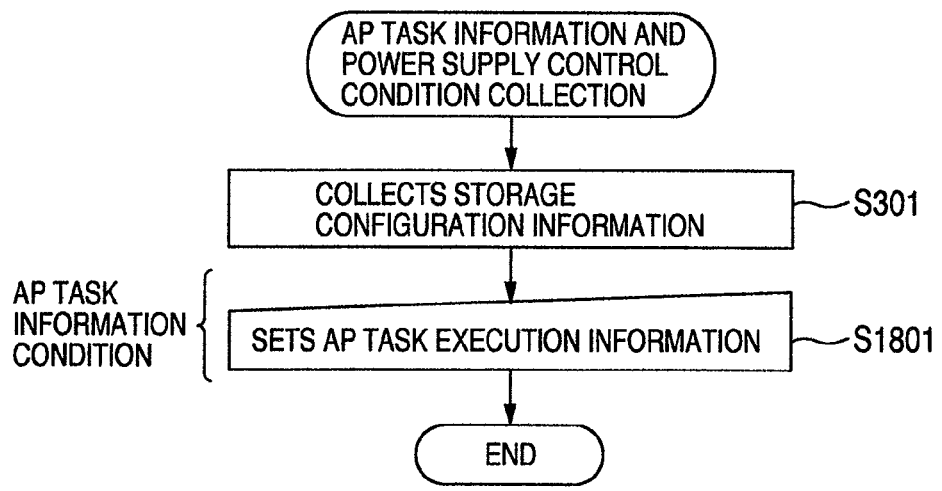
FIG. 19 is a flow chart showing AP task information and power control condition collection according to the second embodiment of the invention.

2.2.1. AP Task Information and Power Control Condition Collection Processing FIG. 19 is a flow chart showing the AP task information and power control condition collection processing performed by the AP task information and power control condition collecting program 2001 according to the operation management program 200 of the second embodiment of the invention. This flow chart is described below with reference to FIG. 19 and FIG. 20.

The storage configuration information collecting step S301 is similar to that of the first embodiment and its description is omitted (see FIG. 3).

After the storage configuration information collection step S301, the operation management program 200 executes an AP task execution information setting step (step S1801).

In the AP task execution information setting step, the operation management program 200 obtains from the each server 101 the task name of the task executed by the AP 102 on the server 101 in order to collect the AP task information. Based on the obtained task name, a screen used by the user to set the completion intervals of the individual tasks is shown on the display unit 111. The "completion interval" corresponds to the completion cycle of each task and means the longest time between the completion of a certain task and the next completion of that task. The each task is reexecuted in the time falling in the completion interval from the completion of the execution. Namely, the completion interval of the task is used as a trigger to execute the individual tasks. For example, if the task to be executed is backup processing of the storage system, this completion interval corresponds to RPO (Recovery Point Object).

Figure 20:
FIG. 20 shows an overview of an AP task execution information setting step performed by an operation management program 200 according to the second embodiment of the invention.

FIG. 20 shows an overview of an AP task execution information setting step performed by the operation management program 200 according to the second embodiment of the invention. FIG. 20 shows a screen example that the user sets the completion interval of each task, and the task is scheduled and executed while satisfying the completion interval set on this screen. This screen shows a table having a column "task name" and a column "task completion interval", and the column "task completion interval" is provided with boxes into which the user can input so as to set a task completion interval of each task. When the user sets the completion interval of each task on the screen through the input unit 119, the operation management program 200 stores the completion interval input on the screen into the fields of a completion interval 2019B of the AP task execution information table 2019 of FIG. 20.

FIG. 20 shows the AP task execution information table 2019, and the AP task execution information table 2019 includes as fields an AP task name 2019A which is executed by the AP 102 on the server 101, the completion interval 2019B which is an interval in which the AP task is completed, and a last completion time 2019C which indicates date and time when the previous AP task was completed.

The AP task execution information table 2019 of FIG. 20 is described specifically. Values such as task names "task A", "task B", "task C" and "task D" of the tasks obtained from the server 101 are stored in the fields of the task name 2019A. When attention is paid to the task A, a value "24 hours" is stored as the completion interval input into the fields of the completion interval 2019B of task information by the user through the input unit 119. And, a value "2007/01/02/12:00 (12:00, Jan. 2, 2007)" obtained from the timer 120 is stored as the time when the task A is completed last time into the fields of the last completion time 2019C of task information.

2.2.2. AP Task Execution Monitoring and Power Control Processing

Figure 21A:
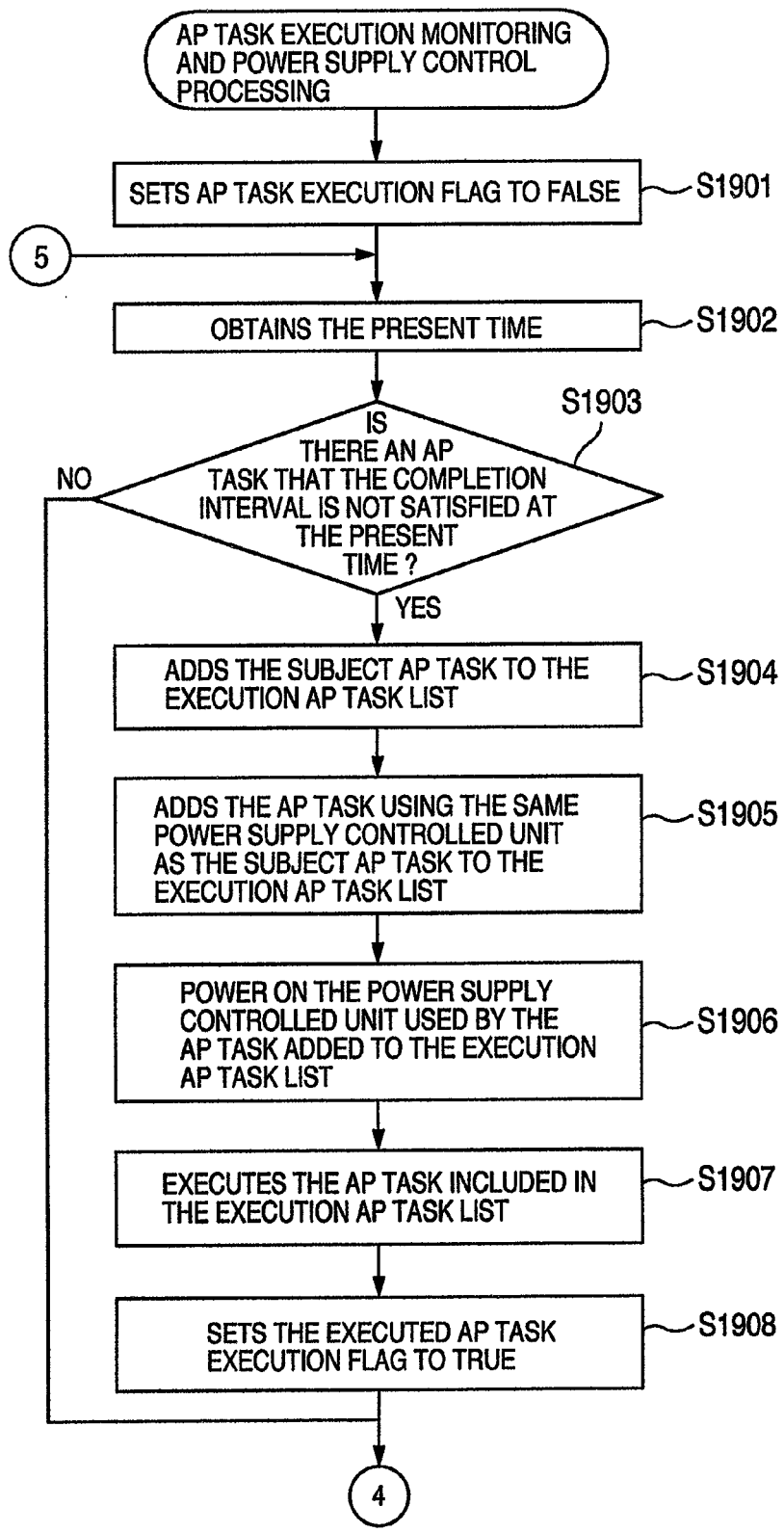
FIG. 21A is part one of a flow chart showing the AP task execution monitoring and power control processing according to the second embodiment of the invention.
Figure 21B:
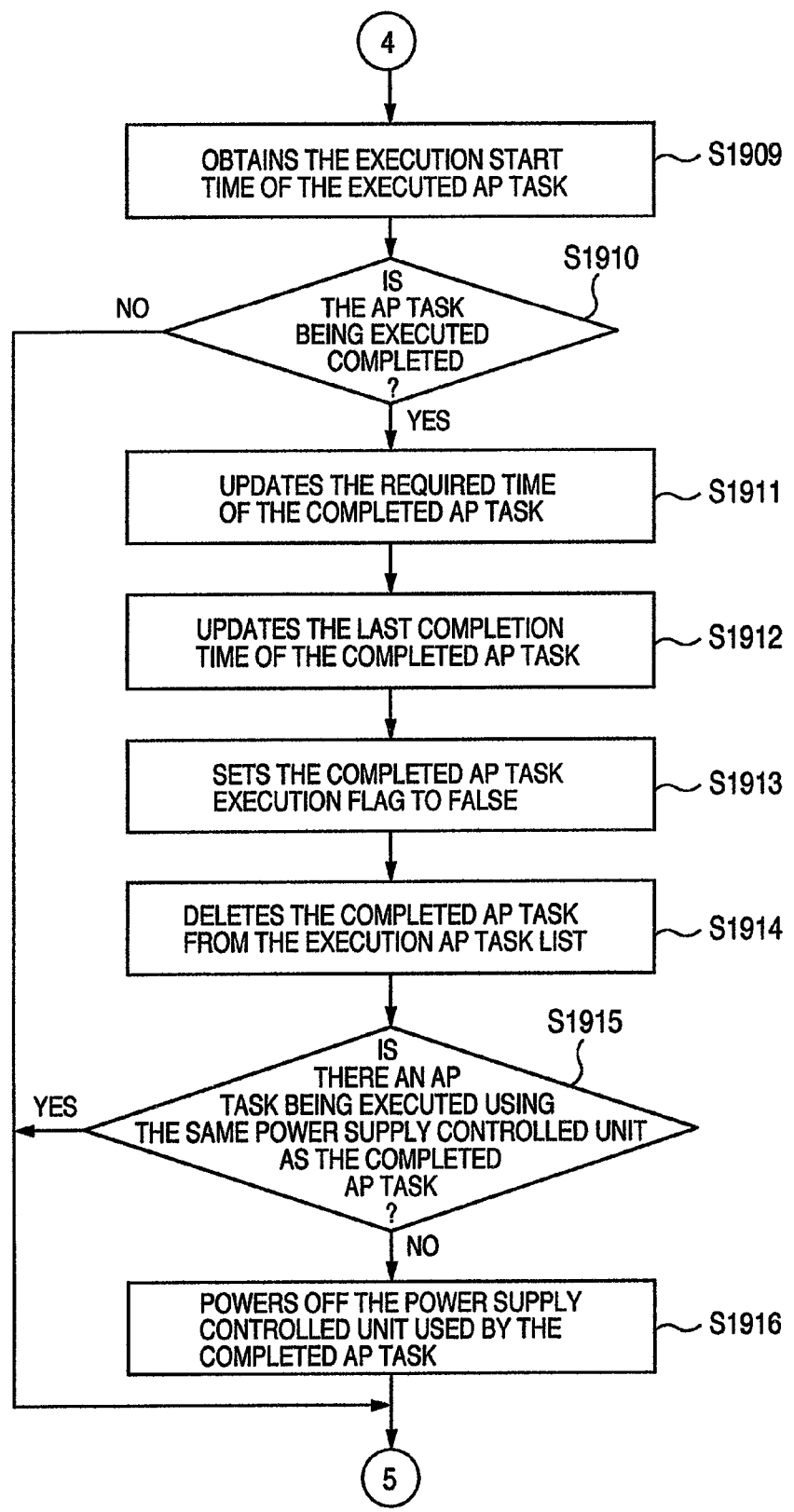
FIG. 21B is part two of the flow chart showing the AP task execution monitoring and power control processing according to the second embodiment of the invention.

FIG. 21A and FIG. 21B are flow charts showing AP task execution monitoring and power control processing performed by the AP task execution monitoring program 2005 according to the operation management program 200 of the second embodiment of the invention.

In step S1901, the operation management program 200 obtains the AP task names of AP tasks which operate on the server 101 from the AP task information table 2012 (see FIG. 6). For the each AP task, an AP task execution flag indicating whether the AP task is being executed or not is prepared and set to FALSE. The AP task execution flag is "TRUE" when the AP task is being executed or "FALSE" when it is not being executed.

In step S1902, the present time is obtained from the timer 120.

It is judged in step S1903 whether there is an AP task that the completion interval is not satisfied at the present time obtained in the step S1902. Here, a difference between the present time obtained in the step S1902 for each AP task and the last completion time which is stored in the field of the last completion time 2019C in the AP task execution information table 2019 (see FIG. 20) is determined, and the obtained difference is determined to be an elapsed time. In addition, the required time is obtained from the field of the required time 2012E by referring to the AP task information table 2012 (see FIG. 6) for each AP task. When a total of the elapsed time and the required time of each AP task is greater than the completion interval obtained from the fields of the completion interval 2019B in the AP task execution information table 2019, it is judged that the completion interval is not satisfied, it is determined "Yes" and the procedure moves to step S1904, but when it is smaller, it is judged that the completion interval is satisfied, it is determined "No" and the procedure moves to step S1909. Here, it is assumed that the judgment is "Yes", and the procedure moves to the step S1904.

In the step S1904, the subject AP task which is judged that the completion interval is not satisfied in the step S1903 is added to the execution AP task list.

In step S1905, the AP task using a volume which belongs to the same power controlled unit as the power controlled unit, to which the volume used by the subject AP task belongs, is added to the execution AP task list. Here, a list of use volume IDs of the used volumes is obtained from the fields of the use volume ID 2012B by referring to the AP task information table 2012 (see FIG. 6) by the name of the AP task added to the execution AP task list. In addition, a list of assigned power controlled unit IDs is obtained from the fields of the assigned power controlled unit ID 2011C by referring to the storage configuration information table 2011 (see FIG. 4) on the basis of the list of use volume IDs, and a list of volume IDs belonging to the list of assigned power controlled unit IDs is obtained from the fields of the volume ID 2011A. A task name using such a volume is obtained from the fields of the task name 2012A by referring to the AP task information table 2012 (see FIG. 6) on the basis of the list of the assigned volume IDs, and an AP task for the obtained task name is added to the execution AP task list.

In step S1906, the power controlled unit used by the AP task added to the execution AP task list developed through the steps up to the step S1905 is powered on. Here, the ID of the assigned power controlled unit obtained in the step S1905 is used to request the controller 105 with a power control function of the storage system 104 to power on.

In step S1907, the AP task included in the execution AP task list developed through the steps up to the step S1905 is executed. Here, the name of the AP task added to the execution AP task list developed through the steps up to the step S1905 is used to request the AP 102 on the server 101 to execute the AP task.

In step S1908, it is set to update the AP task execution flag executed in the step S1907 to TRUE.

If it is judged "No" in the step S1903 or when the step S1908 is completed, step S1909 is executed. In the step S1909, the execution start time of the AP task (AP task execution flag is set to TRUE) executed in the step S1908 is obtained from the timer 120.

It is judged in step S1910 whether the AP task being executed is completed. Here, a task name that the AP task execution flag is TRUE is obtained from the AP task information table 2012 (see FIG. 6). In addition, the obtained AP task name is used to ask the AP 102 on the server 101 to execute the AP task. If there is a completed AP task, it is judged "Yes" and the procedure moves to step S1911, but if there is not, it is judged "No", and the procedure moves to step S1902. Here, it is assumed that the judgment is "Yes", and the procedure moves to the step S1911.

In the step S1911, the required time of the AP task completed in the step S1910 is updated. Here, the required time is determined from a difference between the present time obtained in the step S1902 and the execution start time obtained in the step S1909. In addition, for the determined required time, a value stored in the field of the required time 2012E of the subject AP task in the AP task information table 2012 (see FIG. 6) is updated to the determined required time.

In step S1912, the last completion time of the completed AP task is updated. For the present time obtained in the step S1902, the value stored in the field of the last completion time 2019C of the subject task is updated to the obtained present time in the AP task execution information table 2019 (see FIG. 20).

It is set in step S1913 to update the AP task execution flag judged to have been completed in the step S1910 to FALSE.

In step S1914, the AP task judged to have been completed in the step S1910 is deleted from the execution AP task list.

In step S1915, it is judged whether the volume used by another AP task being executed belongs to the power controlled unit to which the volume used by the completed AP task belongs. Namely, it is judged whether there is an AP task being executed and using the same power controlled unit as the completed AP task. Here, the list of the using volume IDs is obtained from the fields of the use volume ID 2012B by referring to the AP task information table 2012 (see FIG. 6) by the name of the completed task. In addition, in the list of the obtained volume IDs, the list of the assigned power controlled unit IDs to which the volume belongs is obtained from the fields of the assigned power controlled unit ID 2011C by referring to the storage configuration information table 2011 (see FIG. 4). Besides, the obtained assigned power controlled unit ID is used to obtain a list of volume IDs of the volumes belonging to the power controlled unit from the fields of the volume ID 2011A in the storage configuration information table 2011. And, the obtained list of volume IDs is used to obtain the task name using the volume ID obtained from the fields of the task name 2012A by referring to the AP task information table 2012 (see FIG. 6). The AP task execution flag of the obtained task name is checked, and if there is at least one AP task which becomes TRUE, it is judged "Yes", and the procedure moves to the step S1902, and if there is not any AP task which becomes TRUE, it is judged "No", and the procedure moves to step S1916. Here, it is assumed that the judgment is "No", and the procedure moves to the step S1916.

In the step S1916, the power controlled unit, to which the volume used by the AP task judged to have been completed in the step S1910 belongs, is powered off. Here, the list of the assigned power controlled unit IDs obtained in the step S1915 is used to request the controller 105 with a power control function of the storage system 104 to power off.

Thus, the AP task execution monitoring and power control processing is completed.

By performing the above-described AP task execution monitoring and power control processing, the AP task execution and power control can be performed while satisfying the completion interval of the AP task which is a requirement for the AP task.

In this embodiment, the example of setting the completion interval of the individual AP tasks with the startup of the AP task used as a trigger was described. But, there is also another method which is started when a certain AP task is executed by the user. As in the above examples, this embodiment monitors a task execution state by determining the timing of starting the task execution. And, following the execution of a certain task, it is made possible to realize power saving by scheduling to execute another task.

2.3. Summary of the Second Embodiment

The second embodiment provides the following effects. Specifically, an effect of realizing optimum power saving is produced for a storage system that executes plural tasks, when the power control is performed by the power controlled unit to which a logical volume belongs, by executing another task to follow the execution of a specified task according to the completion interval of the tasks. Thus, a possibility of an occurrence of a situation that a task is not executed even if the power is on is decreased.

When the user merely sets the completion interval for each task, simple scheduling of the task can be performed without involving an interaction such as selection of a schedule plan without the user knowing.

The storage environment changes every second, so that there is a case that it is hard to equally set a task executable time zone for the individual tasks. And, it is sometimes necessary to develop a schedule plan with attention paid to execution order of the tasks that another task must be executed to execute a prescribed task. In this embodiment, it is not necessary to set the task executable time zone from the start, and since the completion of execution of a task is presumed from the completion interval, it is not necessary to pay attention to the execution order of the tasks, and the scheduling can be made easily.

The above-described embodiments are best modes for carrying out the present invention but do not limit the invention to them, and other changes and modifications of the embodiments may be made without departing from the scope of the invention.

The invention claimed is:

1. A first storage system, comprising:
a second storage system which has a memory device and creates a storage memory area from the memory device;
a server device which is connected to the second storage system through a network and that can access the storage memory area; and
a management device which is connected to the second storage system and the server device through networks and manages the storage environment,
wherein the second storage system has a power control means for performing power control for each power controlled unit being formed of the storage memory area, and said power controlled unit is a unit of power control of a power supply required for operating the memory device,
wherein the server device has an application for executing a task using the storage memory area, and
wherein the management device is adapted to:
store storage configuration information which sets the correspondence relation between the storage memory area and the power controlled unit to which the storage memory area belongs;
store task management information which sets the correspondence relation between the task and the storage memory area which is used by the task when it is executed;
collect conditions for the execution of the task;
collect conditions for the power control; and
execute the task and executing the power control according to schedule plans which are developed to satisfy conditions for the execution of the task and conditions for the power control on the basis of the storage configuration information and the task management information.

2. The first storage system according to claim 1, wherein the conditions for the execution of the task are conditions which set an executable time zone of the task, wherein the conditions for the power control are conditions which set a value of allowable peak power of the second storage system and the number of power-offs of the power controlled unit, and
wherein when the schedule plans are developed, a total value of power consumption of the power controlled unit in a prescribed period and a value of peak power in a prescribed period produced by activating the power controlled unit are calculated as evaluation values for evaluation of the schedule plans.

3. The first storage system according to claim 2, wherein the management device comprises:
a display means for showing the schedule plans together with the evaluation values; and
an input means which can be used by a user to select a desired one from the shown schedule plans.

4. The first storage system according to claim 3, wherein the schedule plans are rearranged and shown on the display means in ascending order of the total value of the power consumption according to the evaluation values.

5. The first storage system according to claim 3, wherein the management device executes the task and the power control according to the schedule plan selected by inputting through the input means.

6. The first storage system according to claim 1,
wherein the management device is further adapted to:
store task actual execution time information which sets the correspondence relation between the task and actual execution time required for execution of the task; and
receive the timing of power control for execution of the power control of the each power controlled unit from the second storage system, and wherein when the timing of power control is received, an actual execution time of a task using a storage memory area belonging to the power controlled unit, which becomes a subject of the received timing of power control, is obtained from the task actual execution time information.

7. The first storage system according to claim 6, wherein the management device is further adapted to:
change the schedule plan according to the actual execution time to execute another task in accordance with the executed task; and
execute the task and the power control according to the changed schedule plan.

8. A first storage system comprising:
a second storage system which has a memory device and creates a storage memory area from the memory device;
a server device which is connected to the second storage system through a network and can access the storage memory areal and
a management device which is connected to the second storage system and the server device through networks and manages the storage environment,
wherein the second storage system has a power control means for performing power control for each power controlled unit being formed of the storage memory area, and said power controlled unit is a unit of power control of a power supply required for operating the memory device,
the server device has an application for executing a task using the storage memory area, and
the management device being adapted to:
store storage configuration information which sets the correspondence relation between the storage memory area and the power controlled unit to which the storage memory area belongs;
store task management information which sets the correspondence relation between the task and a storage memory area which is used by the task when it is executed;
store task execution timing information which sets the correspondence relation between the task and the timing of starting the task execution;
execute the task and the power control on the basis of the task execution timing information; and further
specify one task of which execution is started on the basis of the task execution timing information, specifies another task which has the same power controlled unit as that activated when the former task is executed based on the storage configuration information and the task management information, and perform the execution of the former task and the latter task and the execution of the power control of the common power controlled unit.

9. A management device management of a storage environment, the management device comprising:
a central processing unit (CPU); and
a memory device storing an application program therein,
wherein the management device is connected through a network to a storage system and a server device,
wherein the storage system has a memory device and a power control means which creates a storage memory area from the memory device, has a power control means for performing power control for each power controlled unit being formed of the storage memory area, said power controlled unit is a unit of power control of a power supply required for operating the memory device,
wherein the server device is connected to the storage system through a network and can access the storage memory area, and has an application for executing a task using the storage memory area,
wherein the application program causes the CPU to:
store storage configuration information which sets the correspondence relation between the storage memory area and the power controlled unit to which the storage memory area belongs;
store task management information which sets the correspondence relation between the task and the storage memory area which is used by the task when it is executed;
collect conditions for the execution of the task;
collect conditions for the power control; and
execute the task and the power control according to a schedule plan which is developed to satisfy the conditions for the execution of the task and the conditions for the power control on the basis of the storage configuration information and the task management information.

10. A scheduling method for execution of a task and power control of a management device, is connected through a network to a storage system and a server device, which wherein the storage system has a memory device and a power control means which creates a storage memory area from the memory device, and has a power control means for performing power control for each power controlled unit being formed of the storage memory area, said power controlled unit being a unit of power control of a power supply required for operating the memory device, and wherein the server device, which is connected to the storage system through a network and can access the storage memory area, has an application for executing a task using the storage memory area, and wherein the management device manages a storage environment by storing storage configuration information which sets the correspondence relation between the storage memory area and the power controlled unit to which the storage memory area belongs, and task management information which sets the correspondence relation between the task and the storage memory area which is used by the task when it is executed, the scheduling method comprising:
collecting conditions for the execution of the task;
collecting conditions for the power control;
developing, based on the storage configuration information and the task management information, a schedule plan satisfying the conditions for the task execution and the conditions for the power control so as to show the correspondence relation between a task to be executed and a power controlled unit used for the power control executed when the task is executed via the storage memory area; and
executing the task and the power control according to the schedule plan.

11. A recording medium which records a program for execution of a task and power control of a management device for managing a storage environment, wherein the management device is connected through a network to a storage system and a server device, wherein the storage system has a memory device and a power control means which creates a storage memory area from the memory device, and has a power control means for performing power control for each power controlled unit being formed of the storage memory area, said power controlled unit being a unit of power control of a power supply required for operating the memory device, and wherein the server device, which is connected to the storage system through the network and can access the storage memory area, has an application for executing the task using the storage memory area, the program causing the processor to perform steps of:
storing storage configuration information which sets the correspondence relation between the storage memory area and the power controlled unit to which the storage memory area belongs;

storing task management information which sets the correspondence relation between the task and the storage memory area which is used by the task when it is executed;

collecting conditions for the execution of the task;

collecting conditions for the power control; and executing the task and the power control according to a schedule plan which is developed to satisfy the conditions for the execution of the task and the conditions for the power control on the basis of the storage configuration information and the task management information.

* * * * *